(12) United States Patent
Sogawa

(10) Patent No.: US 6,661,449 B1
(45) Date of Patent: *Dec. 9, 2003

(54) OBJECT RECOGNIZING APPARATUS FOR VEHICLE AND THE METHOD THEREOF

(75) Inventor: Yoshiyuki Sogawa, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 402 days.

This patent is subject to a terminal disclaimer.

(21) Appl. No.: 09/648,740

(22) Filed: Aug. 28, 2000

Related U.S. Application Data

(62) Division of application No. 08/856,805, filed on May 15, 1997, now Pat. No. 6,169,572.

Foreign Application Priority Data

Jun. 6, 1996 (JP) .............................................. 8-144438

(51) Int. Cl.⁷ ................................................ H04N 7/00
(52) U.S. Cl. ..................................................... 348/113
(58) Field of Search ............................... 348/113, 114, 348/116, 118, 119; 701/23, 28, 117, 200, 300, 301; H04N 7/00, 7/18, 9/47

(56) References Cited

U.S. PATENT DOCUMENTS 5,410,346 A * 4/1995 Saneyoshi et al. .......... 348/116
5,517,412 A * 5/1996 Unoura ........................ 701/23
5,530,420 A * 6/1996 Tsuchiya et al. ............ 340/435
5,638,116 A * 6/1997 Shimoura et al. ........... 348/118

* cited by examiner

Primary Examiner—Nhon Diep
(74) Attorney, Agent, or Firm—Smith, Gambrell & Russell, LLP

(57) ABSTRACT

A stereoscopic optical system images a stereoscopic picture image, a stereoscopic image processing section calculates a three-dimensional distance distribution from the stereoscopic picture image, and an object recognizing section recognizes objects from the distance distribution information to calculate a relative position of the objects with respect to the vehicle. On the other hand, a travelling amount of the vehicle is detected by a steering sensor and a rear wheel rotation sensor. Then, an object positional information calculating section calculates a new relative position of the objects based on the relative position information memorized in a memory section and the calculated travelling amount of the vehicle and the memory section memorizes the new positional information. And, a bumping judgment outputting section judges the possibility of bumping against the objects based on the new relative position of the objects with reference to memorized information about the external shape of the vehicle. If it is judged therein that there is a possibility of bumping, the bumping judgment outputting section outputs a warning signal to an indicating section.

8 Claims, 21 Drawing Sheets

OBJECT RECOGNIZING APPARATUS FOR VEHICLE AND THE METHOD THEREOF

This application is a division of U.S. application Ser. No. 08/856,805 filed May 15, 1997 U.S. Pat. No. 6,169,572.

BACKGROUND OF THE INVENTION

1. Field of the Invention

The present invention relates to an object recognizing apparatus and method for a vehicle and particularly to an object recognizing apparatus and method to be employed for a drive assist system of an automobile or for an autonomous running control system of an autonomous running vehicle.

2. Prior Arts

In order to compensate an operating sense of a vehicle driver when he passes through narrow roads with frequent obstacles such as walls, poles, guard rails, parked vehicles and the like, there has been developed an apparatus for detecting those obstacles by means of tactile sensors such as a corner pole, a contact switch and the like mounted on a vehicle.

Further, there has been developed a technique in which ultrasonic sensors are mounted on the side face or corners of the vehicle for measuring a distance to an obstacle and informing a vehicle driver of the measured distance.

Further, in recent years, there has been proposed a technology for not only detecting a distance to an obstacle but also recognizing the figure of the obstacle. As an example of such technology, the Applicant of the present invention discloses an obstacle recognition apparatus using a plurality of CCD cameras and a stereoscopic picture image processor for recognizing obstacles around the vehicle to inform the vehicle driver in Japanese Patent Application Laid-open No. Toku-Kai-Hei 5-114099. This obstacle recognition apparatus can not only recognize a direction and shape of an obstacle but also can obtain an exact distance to the obstacle.

In autonomous running vehicles, in order to avoid a collision to or a contact with obstacles during running, there is a technology in which existence or non-existence of obstacles is detected using an infrared sensor or an ultrasonic sensor and when an obstacle exists, such a control as stopping the vehicle is performed.

Further, according to a recent smart autonomous running control vehicle, using the aforementioned stereoscopic picture image processor for recognizing obstacles nearby the vehicle, it is possible to find a plurality of obstacles at the same time, to recognize the direction and figure of these obstacles and further to perform miscellaneous controls such as stopping the vehicle or guiding the vehicle in the direction where there is no obstacle.

However, the aforementioned obstacle recognition apparatus employing stereoscopic cameras has a problem that since it can recognize only obstacles coming into a field view of the cameras, for instance in case of installing cameras with a lens directed ahead of the vehicle, objects existing in the field view of cameras can be recognized but objects existing outside of the field view can not.

Accordingly, when the vehicle turns a corner, there is a possibility that the vehicle may bump an obstacle standing at the corner. To prevent this, it is readily considered that additional cameras are mounted for monitoring obstacles located on both sides of the vehicle, however, this idea is not acceptable because of an additional need for securing the location of cameras and a cost increase.

Particularly, in case of the autonomous running vehicle, for example, in case of a floor cleaning vehicle which does a cleaning work on a floor unmannedly, it is frequently required to make a delicate work around an obstacle. That is to say, the vehicle is required to have a capability of being able to recognize every obstacle therearound. In this case, it is not permissible for the same reason as in the above case to equip additional cameras and the like.

SUMMARY OF THE INVENTION

The present invention has been accomplished in consideration of these circumstances and it is an object of the present invention to provide an object recognizing apparatus capable of recognizing objects around the vehicle over a wide range without the use of additional cameras, ultrasonic sensors, photo sensors or other sophisticated object detecting devices. Such object recognizing apparatus comprises:

object detecting means for detecting a direction of objects and a distance distribution to the objects;

object recognizing means for recognizing the objects as a solid object based on the distance distribution and for calculating a relative position of the objects with respect to the vehicle;

object position memory means for memorizing the relative position of the objects with respect to the vehicle;

travelling amount calculating means for calculating a travelling amount including a travelling distance and a travelling direction of the vehicle; and object positional information calculating means for calculating a new relative position of the objects with respect to the vehicle based on the relative position of the objects and the travelling amount of the vehicle and for updating the relative position memorized in the object position memory means with the new relative position of the objects.

PREFERRED EMBODIMENTS OF THE PRESENT INVENTION

Figure 1:
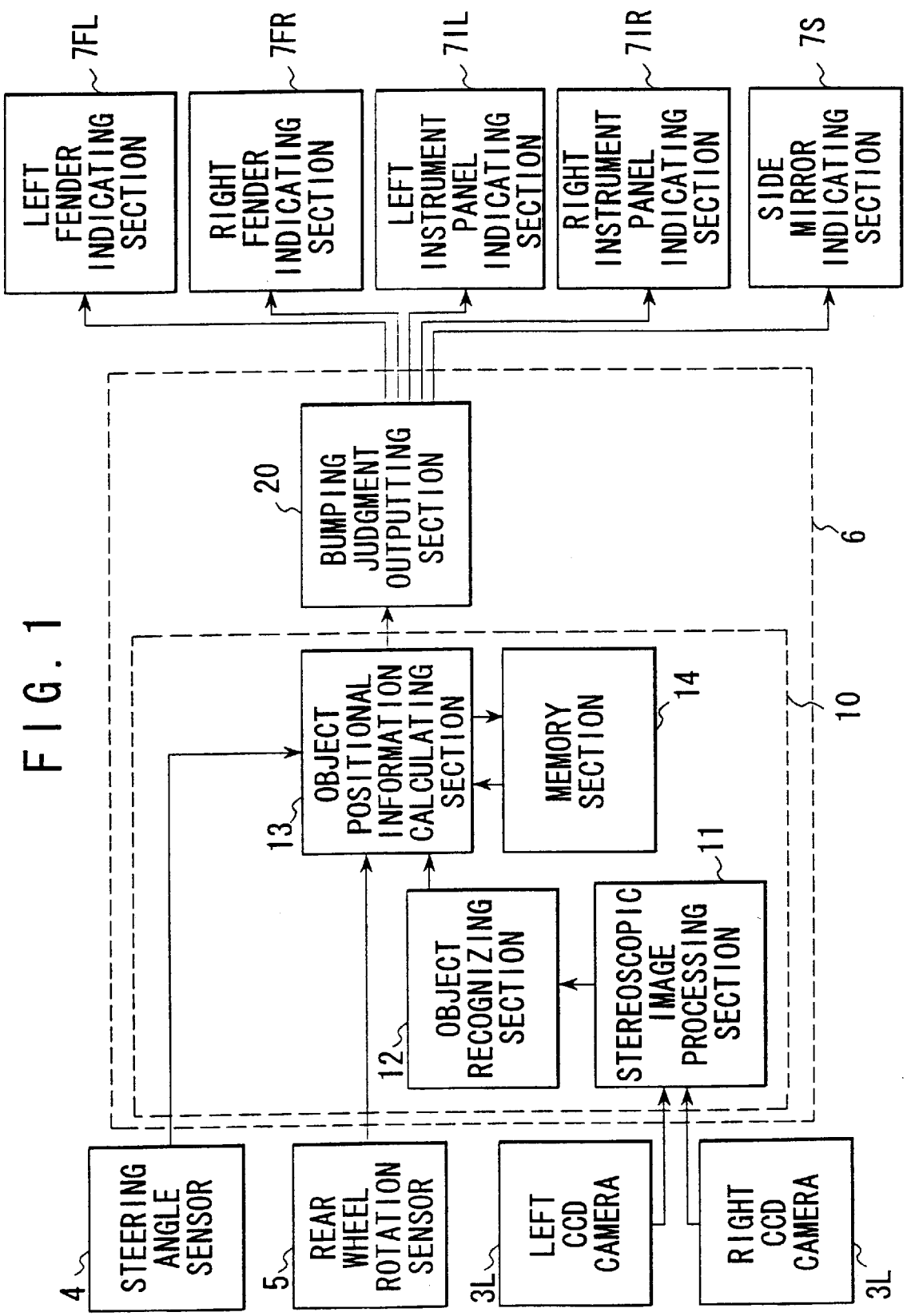
FIG. 1 is a functional block diagram of a drive assist system using an object detecting apparatus according to a first embodiment of the present invention.
Figure 2:
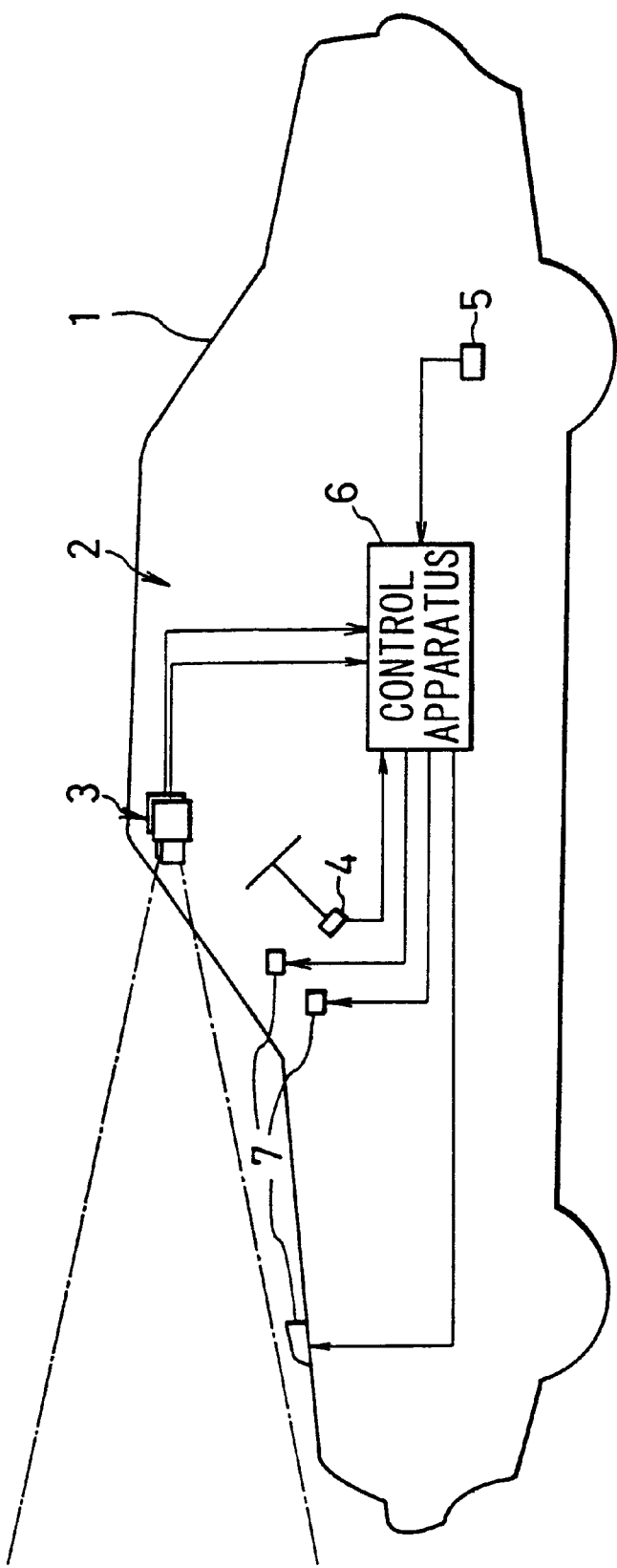
FIG. 2 is a schematic side view showing an overall construction of a drive assist system using an object detecting apparatus according to a first embodiment of the present invention.
Figure 3:
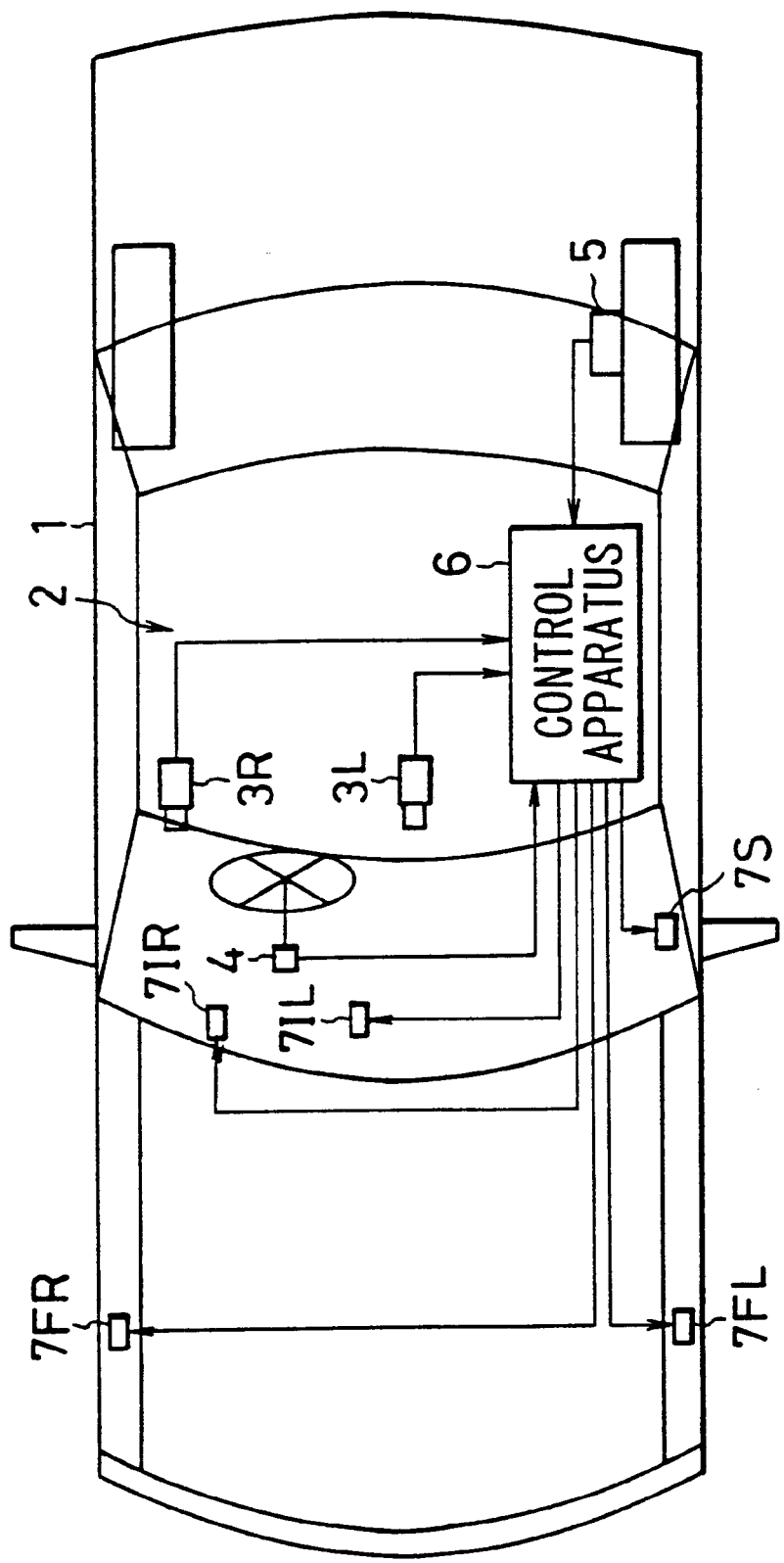
FIG. 3 is a schematic top view showing an overall construction of a drive assist system using an object detecting apparatus according to a first embodiment of the present invention.

Referring now to FIG. 2 and FIG. 3, numeral 1 denotes a motor vehicle incorporating a drive assist system 2 for assisting a driver in judging a possibility of bumping the vehicle against obstacles on a road, such as sidewalls, guard rails, poles, parked automobiles and the like and indicating this result of judgment to him.

The drive assist system 2 comprises a stereoscopic optical system 3 for imaging outside objects within a predetermined range, a steering angle sensor 4 for detecting a steering angle, a rear wheel rotation sensor 5 for detecting a rotation number of a rear wheel, a control apparatus 6 for judging a capability of passing through a narrow road or a possibility of bumping obstacles and an indicating section 7 for informing a vehicle driver of the result of the judgment.

The stereoscopic optical system 3 is composed of a pair of CCD cameras 3L, 3R (left and right one, respectively) which are mounted at a specified interval of distance on the ceiling at the front of the passenger compartment so as to image stereoscopic pictures of objects outside of the vehicle.

The control apparatus 6 comprises an around-vehicle object recognizing apparatus 10 and a bumping judgment outputting section 20. In the object recognizing apparatus 10, positional information of objects around the vehicle is calculated based on the picture image taken by the stereoscopic optical system 3, the steering angle detected by the steering sensor 4 and the rear wheel rotation number detected by the rear wheel rotation sensor 5 and in the bumping judgment outputting section 20, the possibility of bumping obstacles is outputted to the indicating section 7 based on the positional information of objects from the around-vehicle object recognizing apparatus 10 when needed.

The indicating section 7 is constituted by a plurality of light emitting objects like electric lamps and light emitting diodes. Among them, numerals 7FL and 7FR denote an indicating section disposed at the top of the left and right fender of the vehicle body, respectively. Numerals 7IL and 7IR denote an indicating section disposed in the instrument panel and a numeral 7S denotes an indicating section disposed in the neighborhood of the side mirror on the passenger seat side. These indicating sections are operated according to output signals from the bumping judgment outputting section 20. For example, they are constituted such that a red lamp flickers or is turned on when it is judged that a bumping will occur, a yellow one flickers or is turned on when it is judged that a bumping may occur depending on the driver's steering operation in the future, and a green one is turned on when it is judged that there is enough space between the vehicle and objects and there is no fear of bumping, respectively.

The around-vehicle object recognizing apparatus 10 further comprises a stereoscopic image processing section 11, an object recognizing section 12, an object positional information calculating section 13 and a memory section 14.

In the stereoscopic image processing section 11, distance information is obtained over an entire image of a pair of stereoscopic pictures taken by the stereoscopic optical system 3 according to a principle of triangulation, distance images comprising three-dimensional distance distributions are formed based on this distance information and these distance images are outputted to the object recognizing section 12. Thus, object detecting means are formed by the stereoscopic optical system 3 and the stereoscopic image processing section 11.

More specifically, in the stereoscopic image processing section 11, the distance distributions are obtained by finding a coincidence of brightness or color pattern between the left and right picture for each small region constituting a given picture image. Where "i" th picture element of the left and right picture image is designated as $A_i$ and $B_i$ (expressed in brightness or color), respectively, the coincidence evaluation of the left and right picture image is performed based on the following city-block distance H. That is to say, it is judged that the left and right small regions coincide with each other, when the minimum value of the city-block distance H meets a specified condition.

$$H = \Sigma A_i - B_i \tag{1}$$

The distance distribution information, i.e., the distance images are packed in a given size of picture (for example, 400×200 picture elements) having a coordinate system. In this example, the coordinate system has an origin at the left top corner, an "i" axis laterally and "j" axis longitudinally The object recognizing section 12 is an object recognizing means for extracting a plurality of objects existing ahead of the vehicle from the distance image, calculating the position and the size for each object and producing an image of border line of the object. In extracting an object, a discrimination between the object and the road is made based on height information in the three-dimensional position data of the object and a separation of the object from the background is accomplished by distance information. Since this height information or distance information is obtained from a reference coordinate system, first, the coordinate system in the stereoscopic image processing section 11 is transformed into a new coordinate system in the real space around the vehicle 1.

This practical coordinate system in the real space is formed by orthogonal coordinates whose origin is set at the center of the vehicle 1 (correctly, a point on the road surface directly beneath the center of the vehicle), whose X axis is taken in a lateral direction of the vehicle 1, Y axis is in a longitudinal direction thereof and Z axis is in a vertical direction thereof. In this case, an X-Y plane (Z=0) coincides with the road surface, providing that the road is even. In order to calculate the three-dimensional position (X, Y, Z) of an object on the real space coordinate system from the distance information (i, j) in the picture image, a coordinate transformation is performed according to the following formulas (2) and (3):

$$Z=CH-Y \times PW \times (j-JV) \quad (2)$$

$$X=r/2-p+Y \times PW \times (i-IV) \quad (3)$$

where CH; height of cameras
PW; angle of visibility per picture element
IV; i coordinate of infinite-point right in front of vehicle 1
JV; i coordinate of infinite-point right in front of vehicle 1
r; interval of distance between two cameras
p; deviation of center of two cameras from center of vehicle Inversely, the distance information (i, j) in the picture image is calculated from the three-dimensional coordinate (X, Y, Z) of the real space coordinate system according to the following formulas (4) and (5) which are obtained by transforming the formulas (2) and (3).

$$j=(CH-Z)/(Y \times PW)+JV \quad (4)$$

$$i=(X-r/2+p)/(Y \times PW)+IV \quad (5)$$

Further, in the object recognizing section 12, as will be described thereinafter, "object recognition" like a recognition of obstacles such as parked automobiles is performed separately from "wall detection" like a detection of sidewalls on the road side. In case of "object recognition", only an object having a possibility of obstructing the running of the vehicle is selected from the distance image data from the stereoscopic image processing section 11. The distance image is divided into a plurality of regions in the vertical direction. The width of one region has an interval of 8 to 20 picture elements. In this embodiment, since 400 picture elements are arranged in the lateral direction, 20 to 50 regions are formed in one picture image. In the object recognizing section 12, since objects are recognized for each region, a plurality of objects can be detected simultaneously. Then, the distance to the detected objects is also calcuated.

With respect to the objects of each region, three-dimensional position (X, Y, Z) of an object in the real space is calculated from the coordinate (i, j) on the picture image and the distance data Y, using the aforementioned formulas (2) and (3). The height H of the object from the road surface is calculated from the following formula:

$$H=Z-Zr \quad (6)$$

where Zr is the height of the road surface. Generally, Zr is s deemed as 0.0 meter, except the case where the vehicle is inclined or moves in the vertical direction. In case of the object whose height is smaller than 0.1 m or so, that object is not considered to be an obstacle and consequently the data of the object is discarded. As a result, roads themselves, lane markers, shadows and like are deleted from the image. data. On the other hand, the objects higher than the height of the vehicle can be discarded since these are considered to be pedestrian bridges, road. signs and the like. Thus, only objects obstructing running are selected. By this processing of the height data, objects superimposed on the road in the two-dimensional image can be discriminated from the road.

Next, with respect to the data of thus extracted objects in one region, the number of those data included within a predetermined distance Y is counted and a histogram whose axis of abscissa is the distance Y is produced. The predetermined distance Y is established taking the detection limit, the detection accuracy, the shape of object and the like into consideration.

Since erroneously detected values are included in the histogram thus produced, some few data appear at the position where no object exists actually. However, wherever an object of some size exists, a large frequency appears at the position where the object exists. On the other hand, where no object exists, an obviously small frequency appears.

Accordingly, when the frequency exceeds a specified value at a certain distance V, it is judged that an object exists there. If the frequency is below the specified value over a certain range, it is judged that there is no object within that range, whereby an adverse effect of noise can be removed.

When it is judged that objects exist, the distance Y to the object is obtained by averaging the distance data Y and the data in the neighborhood of Y. These processes of detecting objects and calculating the distance are performed for all regions. If the difference between the distance to a detected object in a certain region and the one to a detected object in a proximate region is smaller than a specified value, these objects are deemed to be the same object. On the other hand, if that difference is larger than a specified value, these objects are regarded to be different ones Accordingly, even if a plurality of objects are superimposed on each other, an independent object can be identified by the difference of the distance.

Next, the transformation of the detected objects in the three-dimensional space into the two-dimensional space will be described. First, "three-dimensional window" is established so as to contain the objects and then "two-dimensional window" is obtained from this "three-dimensional window". Specifically, two-dimensional coordinates ($i_n$, $j_n$) are calculated using the aforementioned formulas (4) and (5) with respect to each of the eight vertexes ($X_n$, $Y_n$, $Z_n$) of a three-dimensional window and polygons are produced by enveloping these two-dimensional coordinates ($i_n$, $j_n$). Thus. outlines of the objects are extracted from the data contained in the three-dimensional window.

With respect to the wall detection in the object recognizing section 12, the sidewall on the road side is discriminated from the road by the height difference between the sidewall and the road surface. The discrimination of the sidewall from the far background is made by the difference of distances in the lateral and longitudinal directions of the picture image.

That is to say, extracting only data positioned higher than the established road surface from the distance distribution information, then further extracting only data existing in a predetermined search area of the sidewall from them, if the sidewall exists, the position thereof is expressed in linear equations by applying a huff transformation method. Based on these linear equations, establishing a sidewall existence area in which the sidewall is estimated to exist, the nearest and furthermost ends of the sidewall are detected from the object data in the sidewall existence area.

More specifically, since the sidewall is also an object, first objects data higher than the road surface are extracted from the distance image. Then, the objects data lower than the height of 0.1 m or so is discarded because e those are considered to be white markers, stains, shadows and the like on the road. Further, the objects data higher than the height of the vehicle are discarded because they are considered to be pedestrian bridges, traffic signs and the like. Thus, only objects data above the road surface are selected.

When thus extracted data are processed, since it is not efficient to process all of the data in the picture image, a limit is placed in a search area where the sidewall is to be searched.

Generally, the sidewalls are placed on the left and right side of the road in parallel with the vehicle 1. Further, the sidewall located far from the vehicle can be deleted from the required data. Taking these into consideration, two search areas are provided on the left and right side of the road, respectively and the detection is made separately for each.

Next, the three-dimensional position (X, Y coordinates) of the objects contained in each of the search areas are calculated. Since the data in the search areas contain not only the data of the sidewall itself but also do the data of other objects than the sidewall. Further, noise data are included too. From these miscellaneous data, only data arranged linearly are extracted by the use of the huff transformation method and the outline of the sidewall is accomplished.

Specifically, describing the detection of the linear equation according to the huff transformation, first with respect to a position $(X_i, Y_i)$ of an object, a straight line $F_i$ passing $P_i$ is assumed. The equation of the straight line is expressed in the following equation:

$$X = af_i \times Y + bf_i \tag{7}$$

Next, assuming a parameter space parameterizing a gradient af and an intercept bf, a vote is taken on the combination of the parameters $af_i$ and $bf_i$ with respect to $P_i$ $(X_i, Y_i)$.

Since the sidewall is supposed to be arranged approximately in parallel with the vehicle 1, the value of the gradient $af_i$ should be large enough, for example, within a range of ±20 degrees. Further, the value of the intercept $bf_i$ should be −1 m to −10 m on the left side of the road and +1 m to +10 m on the right side, because the detection of an sidewall far from the vehicle is practically nonsense.

This establishment of the ranges forms a rectangular area wherein votes are performed. Further, this rectangular area is divided into lots of lattices. The gradient $af_i$ of the equation (7) is changed by a lattice interval Δaf within the specified range (for example, ±20 degrees). Substituting this gradient $af_i$ and the coordinates $(X_i, Y_i)$ of the object data $P_i$ into the equation (7), the value of the intercept $bf_i$ is obtained. If thus obtained $bf_i$ is within the specified range, a vote is given to a corresponding lattice of the parameter space.

The positional accuracy of of the detected sidewall, in other words, the detecting accuracy of the gradient and intercept of the linear equation is dependent on Δaf and Δbf. Determination of the lattice interval of Δaf, Δbf is made according to the required level of periphery apparatuses using this sidewall information.

If data are arranged in a straight line as a result of voting into the parameter space, the lattice corresponding to the parameters $af_i$, $bf_i$ of the straight line obtains many votes. Resultantly, a local maximum appears in the left and right voting areas.

When a sidewall exists, that is, an obvious array of the object data exists, the local maximum indicates a large value. On the other hand, when no sidewall exists, that is, object data are scattered about, the local maximum shows a small value. Accordingly, the presence of a sidewall can be known by detecting the value of local maximum which is larger than a specified judgment value. This judgment value is determined taking the size of the searching area, the interval of lattice and the like into consideration.

Next, in case where a sidewall exists, the position of the nearest and furthermost ends is detected. First, a wall existence area is established with a straight line along which a sidewall is estimated to exist. The wall existence area has a width of 0.3 m to 1.0 m with the straight line centered. Further, after dividing this area into slices in the Y direction, the number of the object data in the slice is counted up to prepare a histogram. If a slice having a frequency larger than a specified value is found, it is judged that there is a sidewall near there. Thus, the three-dimensional position is calculated for all sidewalls and the nearest and furthermost ends are detected.

In the aforementioned processes, parameters of the position of objects on roads, the shape of objects and other parameters are read from the distance image and inputted to in the object positional information calculating section 13 forming object positional information calculating means.

In the object positional information calculating section 13, after the object positional information memorized in the memory section 14 being updated, new object positional information around the vehicle is calculated based on the steering angle detected in the steering sensor 4, the rotation number of the rear wheel detected in the rear wheel rotation sensor 5 and information derived from the object recognizing section 12.

Figure 4:
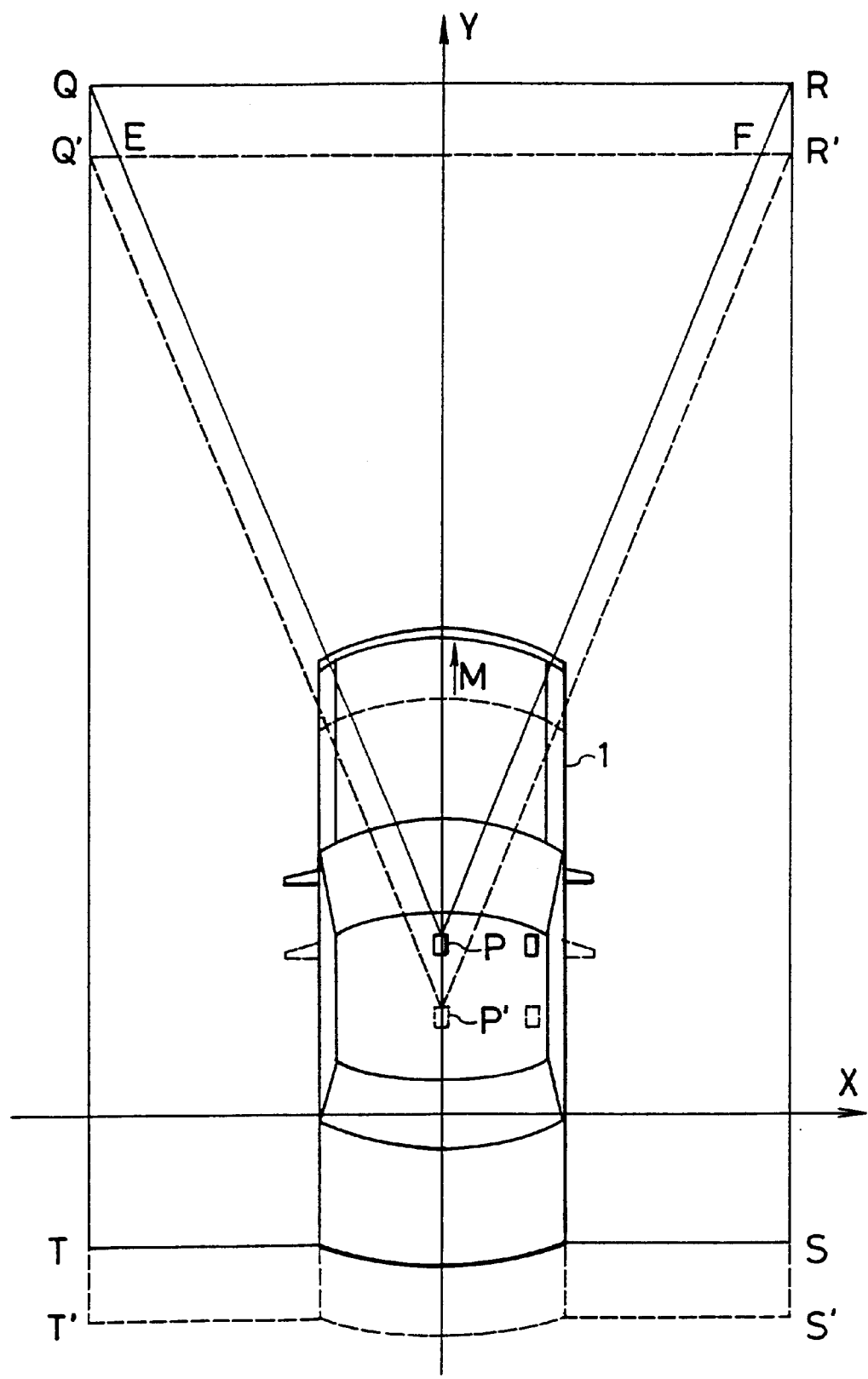
FIG. 4 is a view for explaining positional information of objects around a vehicle according to a first embodiment of the present invention.

Referring to FIG. 4, the new object positional information around the vehicle is positional information within an area QRST and it is formed by newly obtained information (information within an area PQR) from the object recognizing section 12 and by previously obtained information from the object recognizing section 12.

That is to say, when the vehicle travels a distance M and new positional information of the area PQR is obtained from the object recognizing section 12, previous positional information of an area Q'R'S'T' is updated. In this case, the data overflowed out of the memory area (data of an area TSS'T') and the data (overlapped with the newly obtained data of the area PQR) of an area PEF are deleted and then the new positional information of the area PQR is added. Thus obtained data of the present object positional information are memorized in the memory section 14 again and outputted to the bumping judgment outputting section 20. FIG. 4 shows an example of a case of a vehicle travelling forwardly in order to be understood easily, however, also in case where the vehicle makes a turn, the present object positional information are obtained similarly.

Thus, according to the around-vehicle object recognizing apparatus 10 described in the first embodiment of the present invention, since the position of an object can be known even after that object goes out of a field of view of the camera, objects around the vehicle can be recognized at a broad range of area without using additional cameras and other sophisticated devices.

The new object positional information is obtained from the previous object positional information according to formulas as follows.

Figure 5:
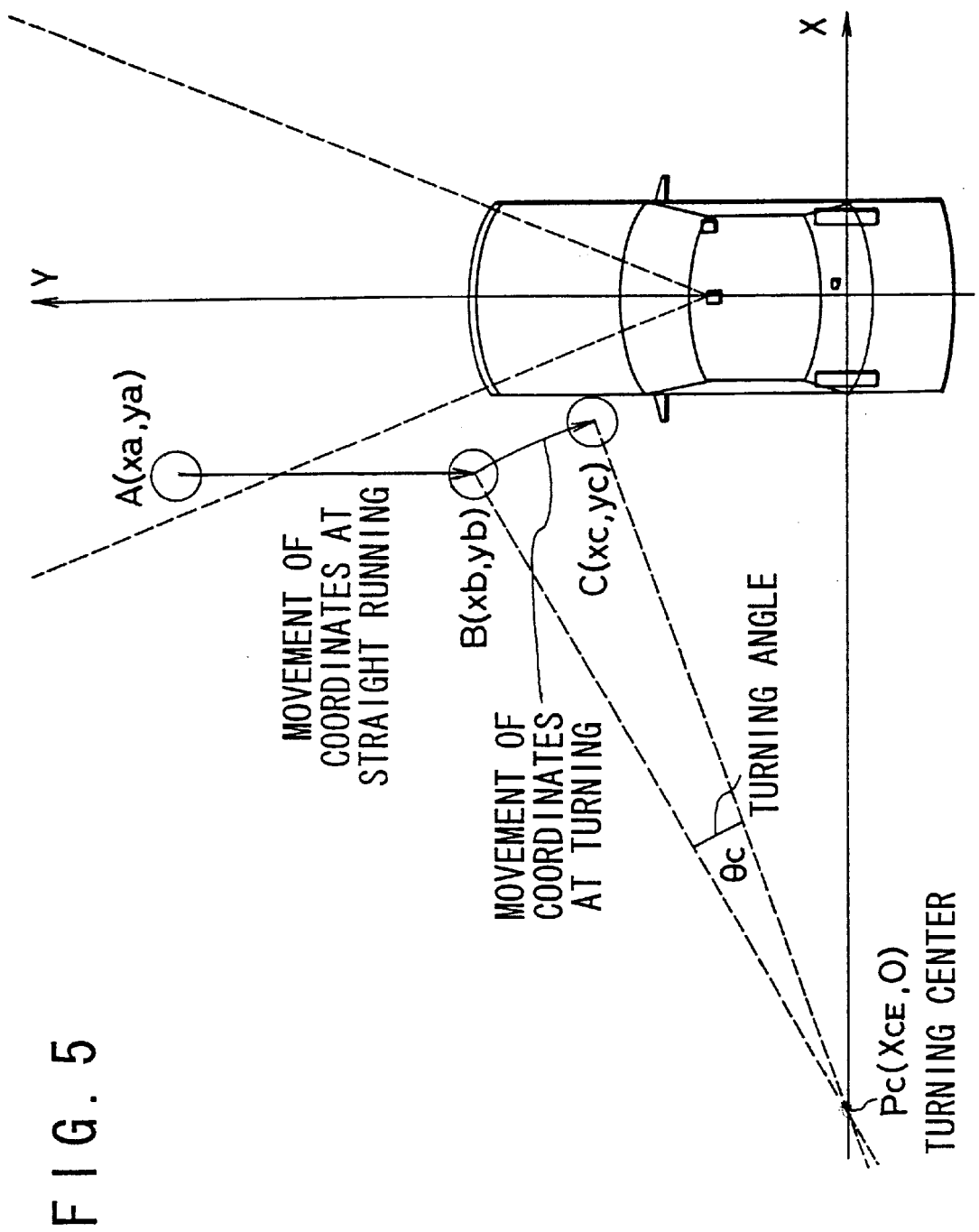
FIG. 5 is a view for explaining a change of a position of an object according to a first embodiment of the present invention.

Referring now to FIG. 5, in case where the vehicle goes straight ahead, an object at the point A ($x_a$, $y_a$) moves to the point B ($x_b$, $y_b$) In this case, since the vehicle goes straight, $x_a$ is equal to $x_b$. Letting the travelling amount of the rear wheel be $\Delta M$, $y_b = y_a - \Delta M$. The previous position expressed in ($x_{old}$, $y_{old}$) is moved to the new position expressed in ($x_{new}$, $y_{new}$) as shown in the following formulas:

$$x_{new} = x_{old} \qquad (8)$$

$$y_{new} = y_{old} - \Delta M \qquad (9)$$

Further, in case where the vehicle makes a turn with the point $P_c$ ($X_{CE}$, $Y_{CE}$) centered, the point B ($x_b$, $x_a$) is moved to the point C ($x_c$, $y_c$). Letting the steering angle be $\delta$, the coordinates of the point $P_c$ are expressed in the following formulas:

$$X_{CE} = f(\delta) \qquad (10)$$

$$Y_{CE} = 0 \qquad (11)$$

where $f(\delta)$ is a value obtained by referring to a predetermined table parameterizing the steering angle $\delta$.

The rotation angle $\theta_c$ at turning is expressed in the following formula:

$$\theta_c = \Delta M / (X_{CE} - X_W) \qquad (12)$$

where $X_W$ is an offset value of the rear wheel in the X direction with respect to the position of the camera.

Further, when the vehicle turns by the turning angle $\theta_c$, the previous object positional information of the coordinate ($x_{old}$, $y_{old}$) is moved to the coordinate ($x_{new}$, $y_{new}$) calculated as follows:

$$x_{new} = r \times \cos(a + \theta_c) + X_{CE} \qquad (13)$$

$$y_{new} = r \times \sin(a + \theta_c) + Y_{CE} \qquad (14)$$

where; $r = ((x_{old} - X_{CE})2 + (y_{old} - Y_{CE})^2)^{1/2}$ $a = \arctan((y_{old} - Y_{CE})/(x_{old} - X_{CE}))$ In the bumping judgment outputting section 20, the possibility of bumping against an object is judged based on thus obtained object positional information and the stored information about the external shape of the vehicle and the result of judgment is outputted to the aforementioned indicating section 7.

Figure 6:
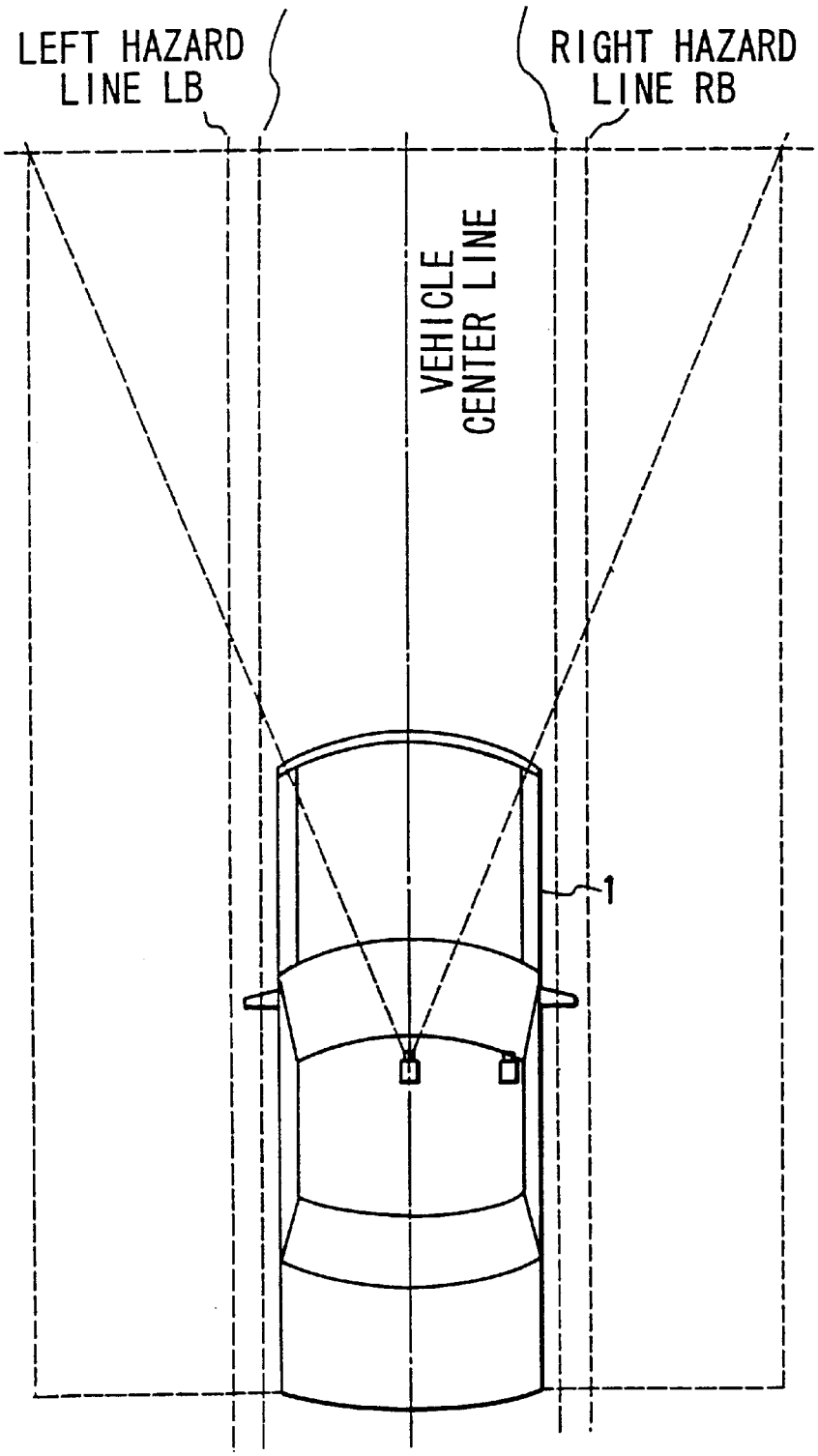
FIG. 6 is a view for explaining hazardous proximity lines in a drive assist system according to a first embodiment of the present invention.

As shown in FIG. 6, a left hazard proximity line LA and a right hazard proximity line RA are established on the left and right sides of the vehicle, respectively. If the object or obstacle exists inside of those hazard proximity lines LA and RA, either of the warning lamps 7FL, 7FR, 7IL and 7IR is selected to flash a red light. For example, if the object exists on the left side of the vehicle, the warning lamp 7FL on the left fender and the warning lamp 7IL on the instrument panel flash. On the other hand, if there is the object on the right side of the vehicle, the warning lamp 7FR on the right fender and the warning lamp 7IR on the instrument panel flash.

Further, a left hazard proximity line LB and a right hazard proximity line RB are established outside of the hazard proximity lines LA and RA, respectively. In case where the object exists between the hazard proximity line LA and the hazard proximity line LB, it is judged that the vehicle may bump against the object depending upon a driver's operation of the vehicle in the future and yellow light flashes in the warning lamps, 7FL and 7IL. On the other hand, in case where the object exists between the hazard proximity line RA and the hazard line RB, similarly yellow light flashes in the warning lamps, 7FR and 7IR.

Furthermore, in case where the object exists outside of the hazard proximity lines LB and RB, it is judged that there is an adequate space between the object and the vehicle and accordingly there is no fear of bumping. In this case, green light is turned on in the warning lamps 7FL and so forth.

In an example shown in FIG. 6, the hazard proximity lines LA, RA, LB and RB are straight lines in parallel with each other but they are not necessarily in parallel or straight. Further, arbitrary shape of lines or curves may be selected or changed variably depending on the vehicle speed and steering angle.

Figure 7:
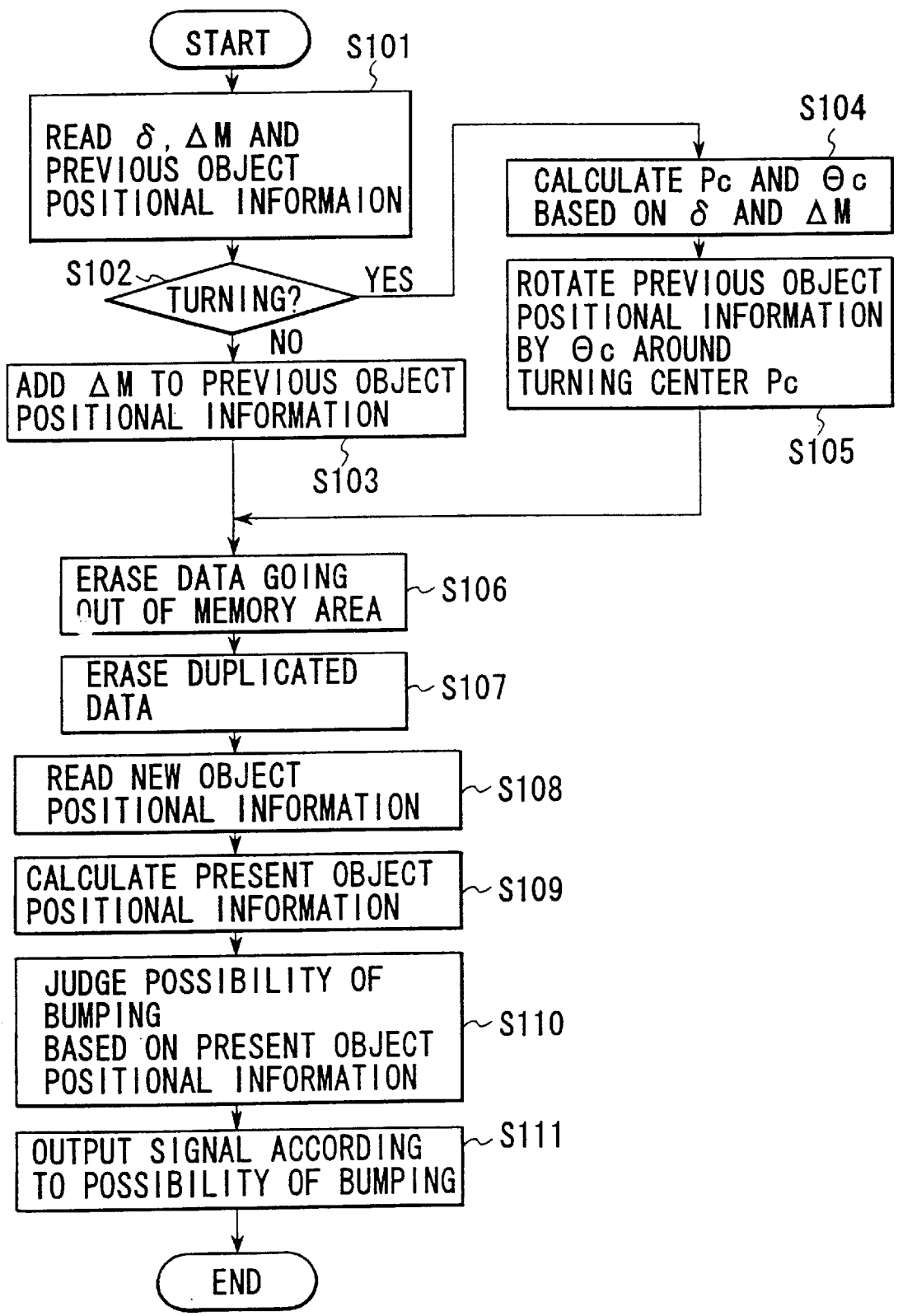
FIG. 7 is a flowchart of a drive assist system according to a first embodiment of the present invention.

The drive assist control according to the first embodiment will be described with reference to a flowchart shown in FIG. 7.

First, at a step 101 (hereinafter, abbreviate as S number) a steering angle 6, a travelling amount of the rear wheel calculated from the rotation number of the rear wheel are read from the steering angle sensor 4 and the rear wheel rotation sensor 5, respectively. Further, at the same time, a previous object positional information is read from the memory section 14 of the around-vehicle object recognizing section 10.

Then, the program goes to S102 where it is judged whether the vehicle 1 is in the turning condition or in the straight running condition. If it is in the straight running condition, the program goes to S103 and if it is in the turning condition, the program steps to S104.

When the program goes to S103, the object positional information is moved to the new object positional information by adding a travelling $\Delta M$ amount of the rear wheel (refer to the formulas (8) and (9)).

On the other hand, when the program goes to S104, the turning center $P_c$ and the turning angle $\theta_c$ are calculated based on the steering angle a and the travelling amount $\Delta M$ of the rear wheel according to the formulas (10), (11) and (12) and at the next step S105, the previous object positional information is rotated as much as the turning angle $\theta_c$ around the $P_c$. Specifically, the new object positional information shown by the coordinates ($x_{new}$, $y_{new}$) is calculated according to the formulas (13) and (14).

The program goes from S103 or S105 to S106 wherein the data forced out from the memory zone by the processes at S103 or S105 are erased.

Next, the program goes to S107 where the data overlapped with the newly obtained object positional information is erased from the previous object positional information.

Next, the program steps to S108 where the newly obtained object positional information, namely, the data of the object which has been obtained by processing the picture image taken by the stereoscopic optical system 3 in the stereoscopic image processing section 11 and the object recognizing section 12 are read. Then, the program steps to S109 where these data are added to the previous object positional information formed at S107 to be memorized. The processes executed at the steps S102 through S108 corresponds to the ones performed in the object positional information calculating section 13 and the memory section 14.

Further, the program goes to S110 in which the possibility of bumping of the vehicle against the object is judged based on this updated new object positional information around the vehicle by referring to the memorized external shape of its own vehicle. Then, the program steps to S111 where a signal is outputted to the indicating section 7 in accordance with the result of the judgment at S110. The processes executed at S110 and S111 corresponds to the ones performed in the bumping judgment outputting section 20.

The above object positional information around the vehicle is read in and processed as the previous object positional information in executing the routine next time.

According to the around-vehicle object recognizing apparatus 10 of the first embodiment, not only the position of the objects at the front of the vehicle can be recognized, but also the position of the objects which have been moved aside of the vehicle as a result of the movement of the vehicle can be known. Accordingly, the vehicle drive assist system employing this around-vehicle object recognizing apparatus can assist a driver's operation over a wide range.

Next, a second embodiment of the present invention will be described with reference to FIGS. 8 through 11.

Figure 8:
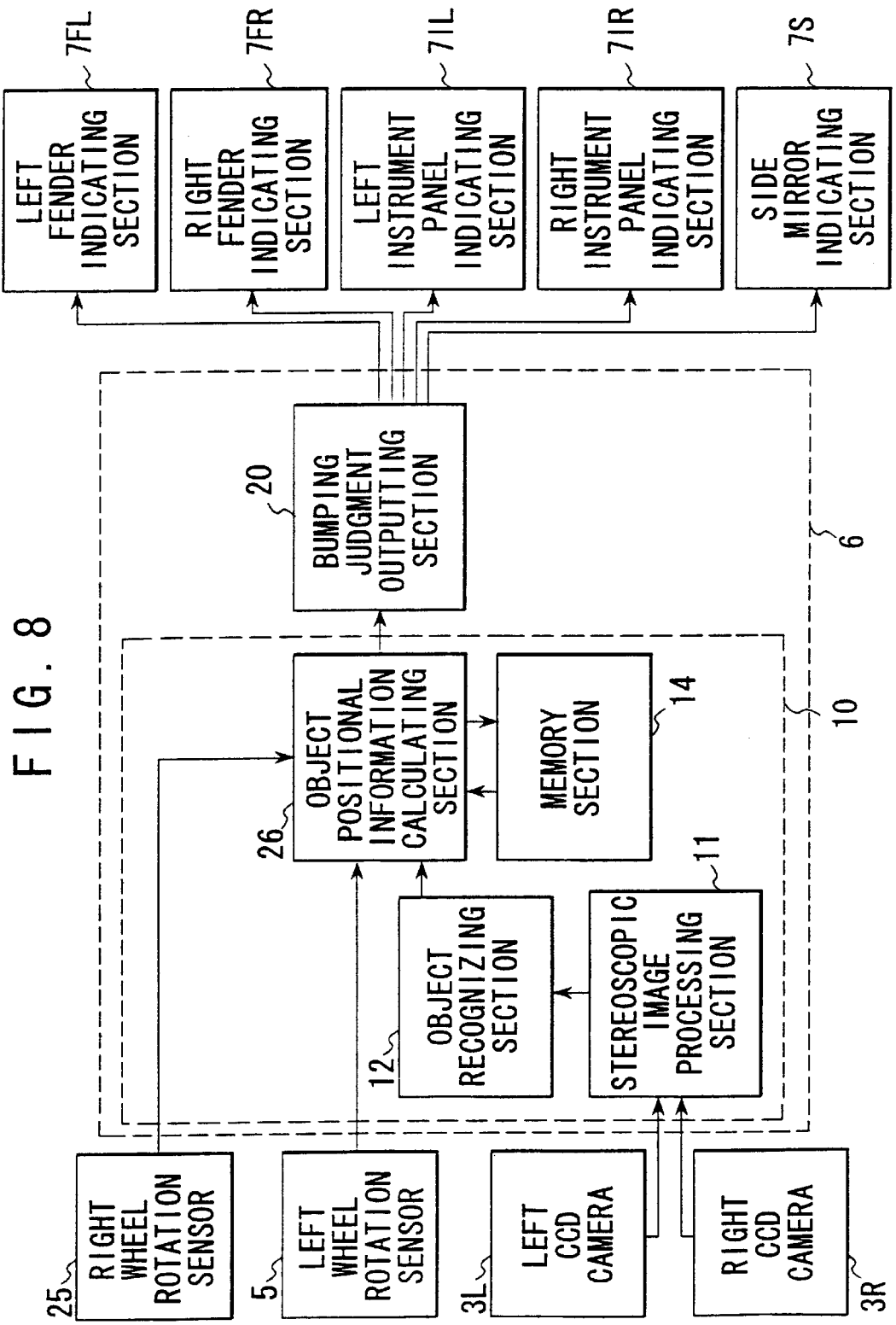
FIG. 8 is a functional block diagram of a drive assist system according to a second embodiment of the present invention.
Figure 9:
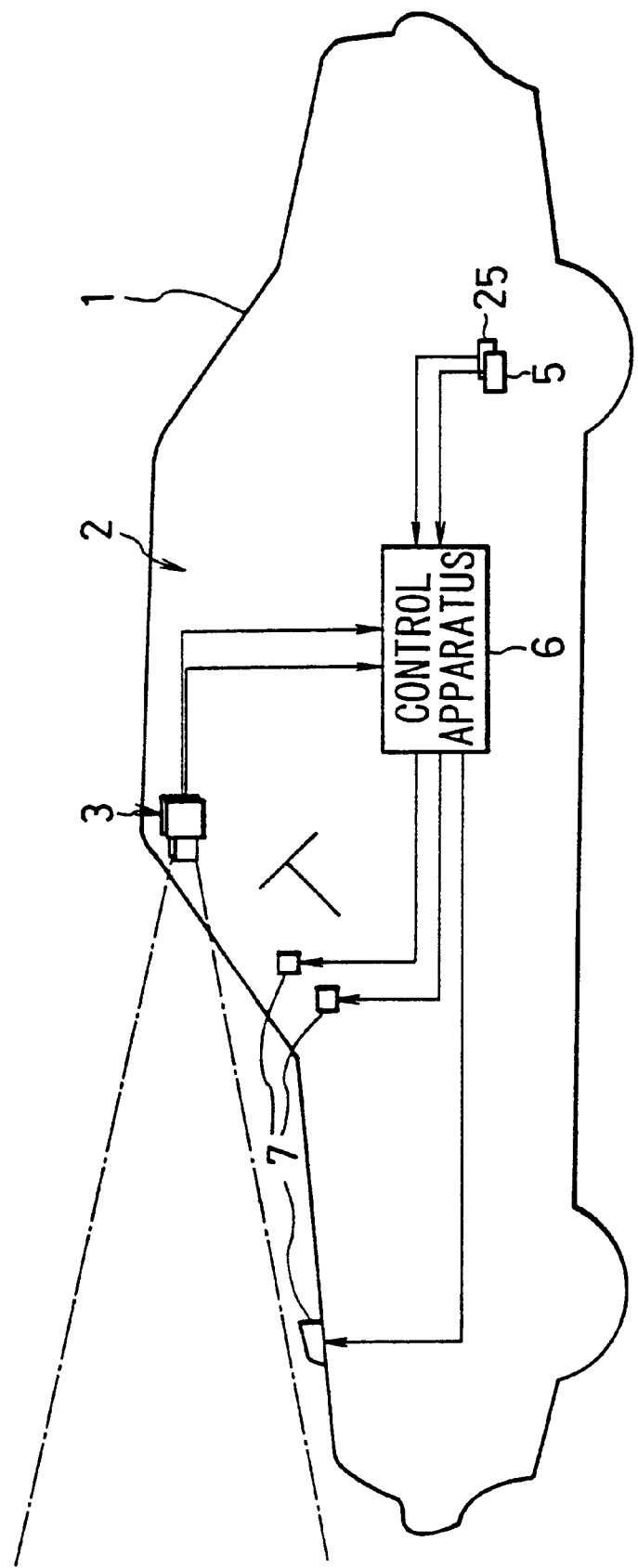
FIG. 9 is a schematic side view showing an overall construction of a drive assist system using an object detecting apparatus according to a second embodiment of the present invention.
Figure 10:
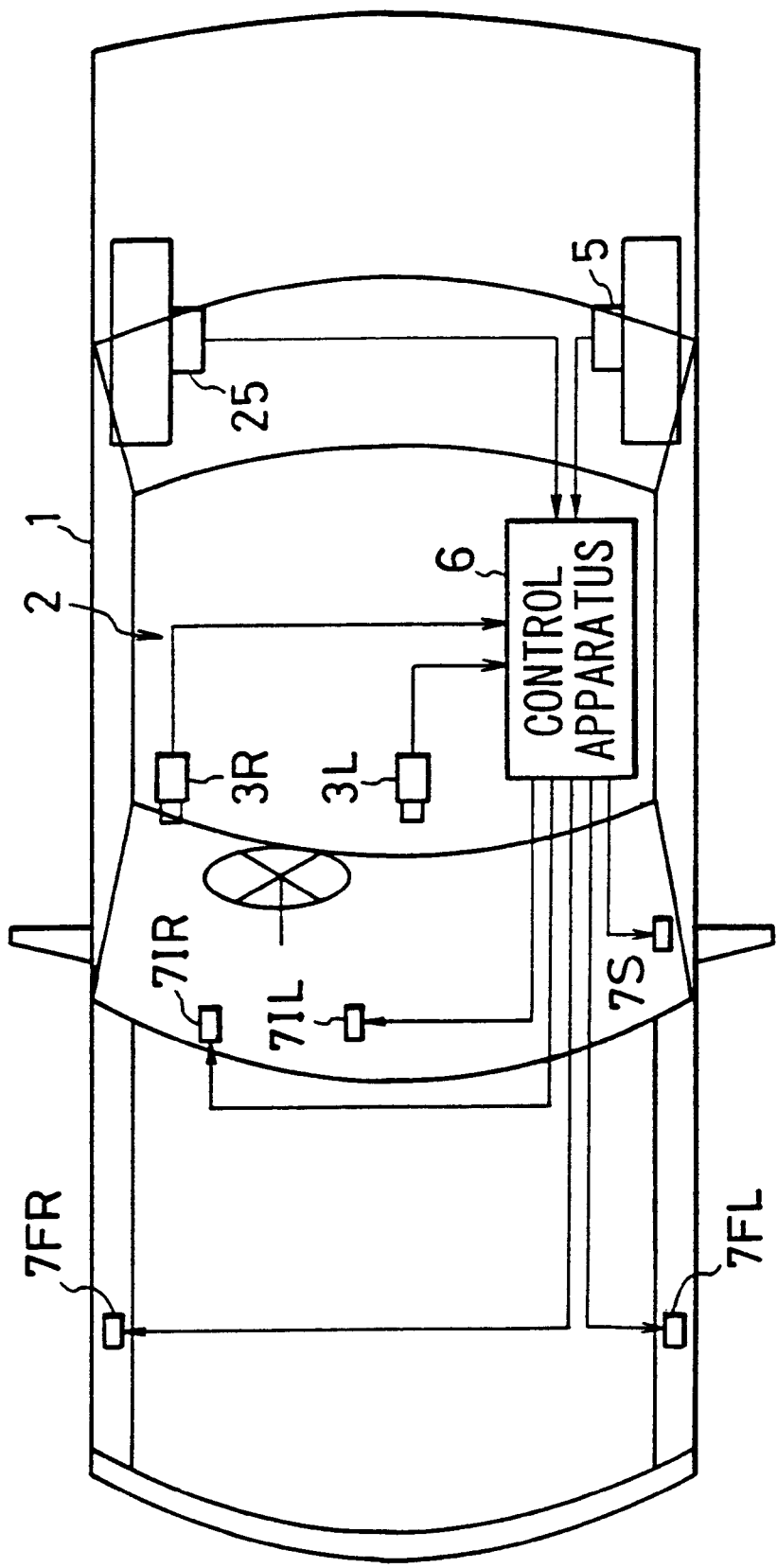
FIG. 10 is a schematic top view showing an overall construction of a drive assist system using an object detecting apparatus according to a third embodiment of the present invention.

Referring now to FIG. 8 and FIG. 9, the drive assist system 2 comprises a left rear wheel rotation sensor 5, a right rear wheel rotation sensor 25, a left CCD camera, a right CCD camera, a control apparatus 6 and indicating sections 7FL through 7S. The control apparatus 6 further comprises an around-vehicle object recognizing apparatus 10 and a bumping judgment outputting section 20. The around-vehicle object recognizing apparatus 10 further comprises a stereoscopic image processing section 11, an object recognizing section 12, an object positional information calculating section 26 and a memory section 14. The object positional information calculating section 26 calculates and outputs a new object positional information around the vehicle to the bumping judgment outputting section 20 based on the rotation amounts of the left and right rear wheels and the previous object positional information around the vehicle which has been memorized in the memory section 14.

This object positional information calculating section 26 has almost the same function as the object positional information calculating section 13 described in the first embodiment of the present invention. Specifically, the movement of the previous object positional information is performed as follows.

Referring to FIG. 5, when the vehicle goes straight on, an object at the point A ($x_a$, $y_b$) moves to the point B ($x_b$, $y_b$). In this case, since a travelling amount ΔML of the left rear wheel is equal to a travelling amount ΔMR of the right rear wheel and further $x_a = x_b$, the previous object positional information shown by coordinates ($x_{old}$, $y_{old}$) is moved the present new object positional information shown by coordinates ($x_{new}$, $y_{new}$) according to the following two formulas:

$$x_{new} = x_{old} \quad (15)$$

$$y_{new} = y_{old} - \Delta MR \quad (16)$$

On the other hand, when the vehicle makes a turn, the object at the point B ($x_b$, $y_b$) moves to the point C ($x_c$, $y_c$). The turning center $P_c$ ($X_{CE}$, $Y_{CE}$) is expressed as follows:

$$X_{CE} = (\Delta MR + \Delta ML)/(\Delta MR - \Delta ML) \times (\text{tread})/2 \quad (17)$$

$$Y_{CE} = (\text{offset amount of rear wheel}) = 0 \quad (18)$$

Further, the turning angle hc from the point B to the point C is expressed in:

$$\theta_c = (\Delta MR - \Delta ML)/(\text{tread}) \quad (19)$$

Where "tread" is a transverse distance between left and right side wheels on the same axle measured between specified points, such as the centers of tire contact.

Thus, the previous object positional information is moved to the present new object positional information shown by coordinates ($x_{new}$, $y_{new}$) by substituting the coordinates ($X_{CE}$, $Y_{CE}$) and the turning angle $θ_c$ into the aforementioned formulas (13) and (14).

Figure 11:
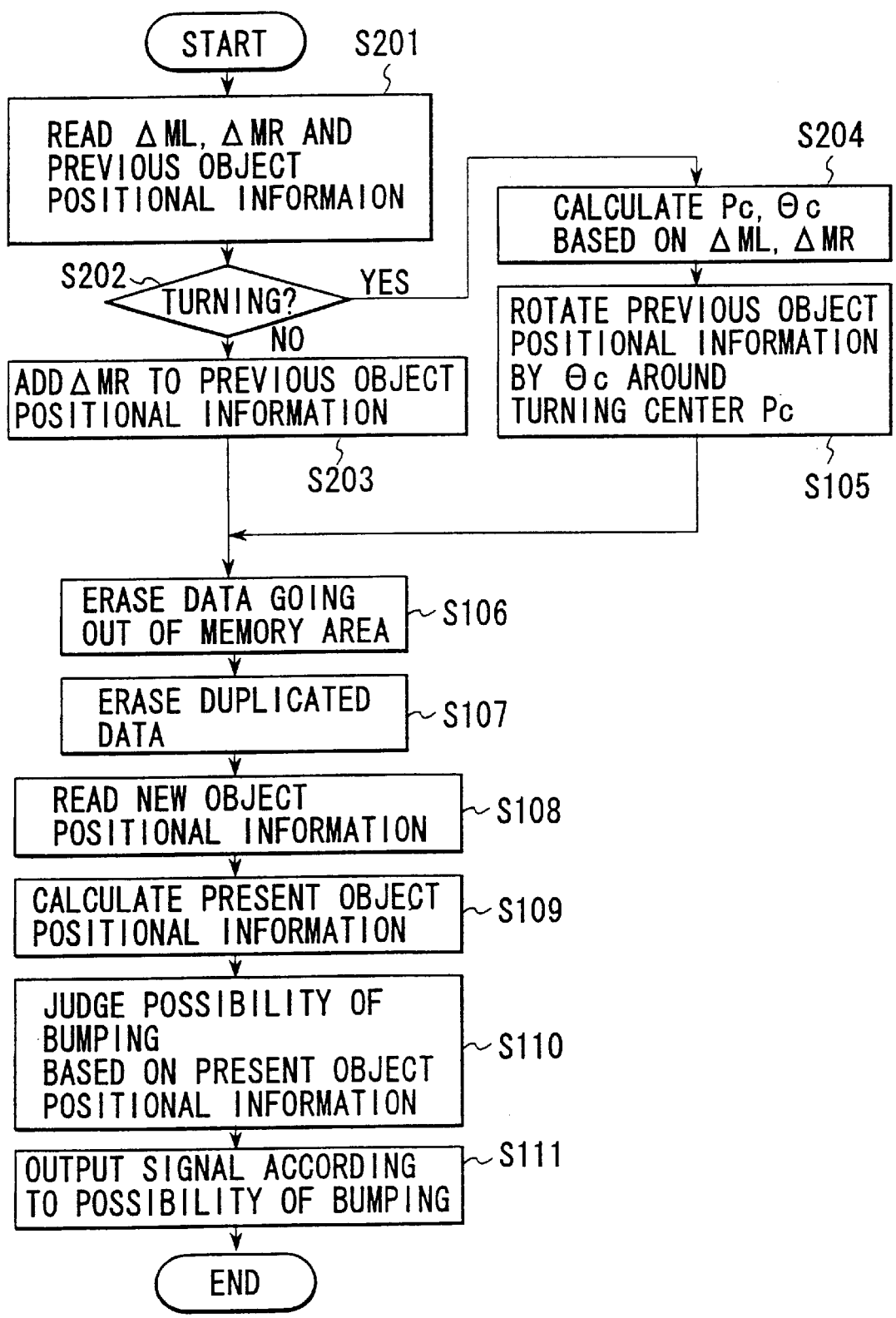
FIG. 11 is a flowchart of a drive assist system according to a second embodiment of the present invention.
Figure 12:
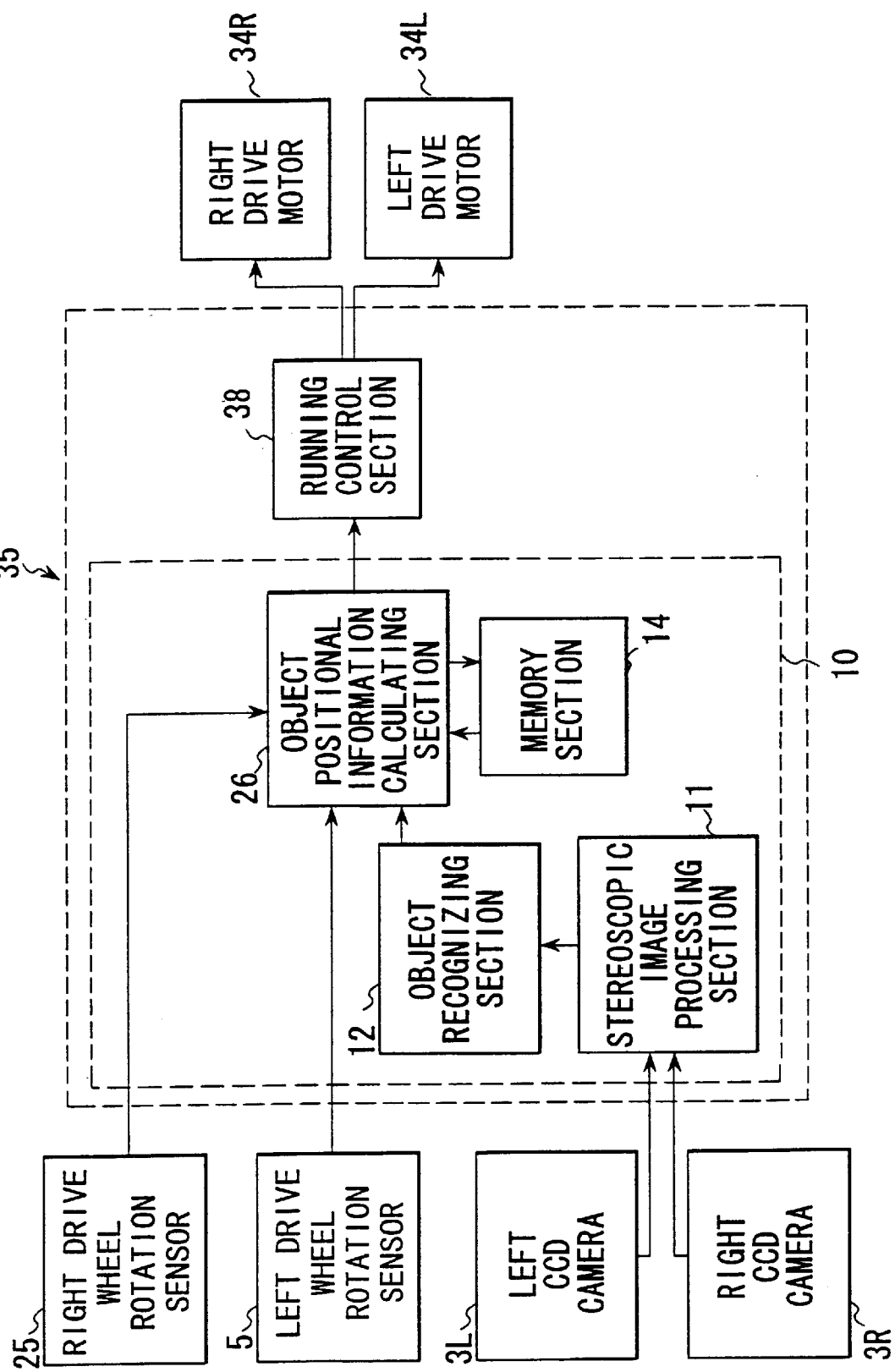
FIG. 12 is a functional block diagram of an autonomous running control system using an object detecting apparatus according to a third embodiment of the present invention.
Figure 13:
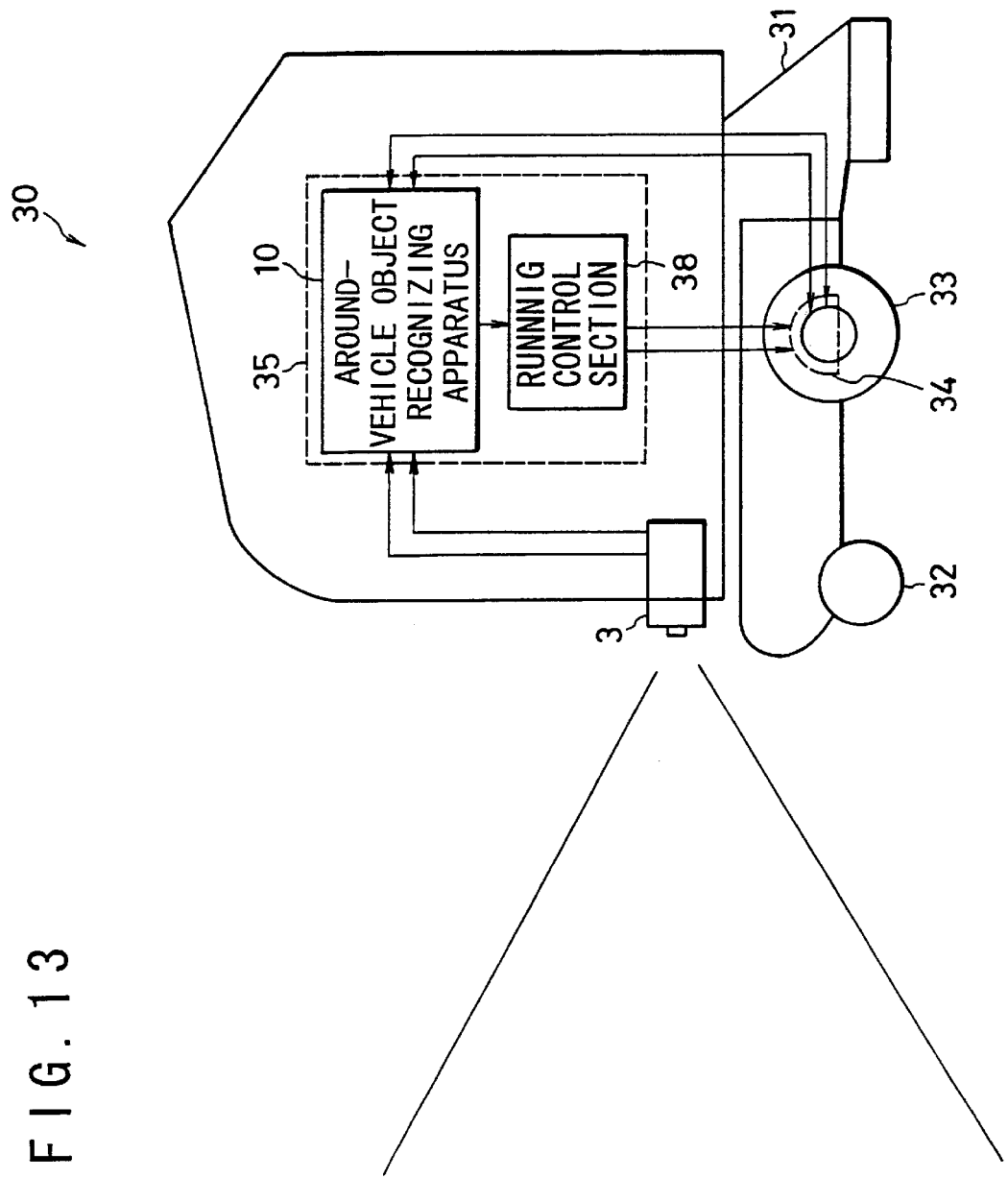
FIG. 13 is a schematic side view showing an overall construction of an autonomous running control system using an object detecting apparatus according to a third embodiment of the present invention.
Figure 14:
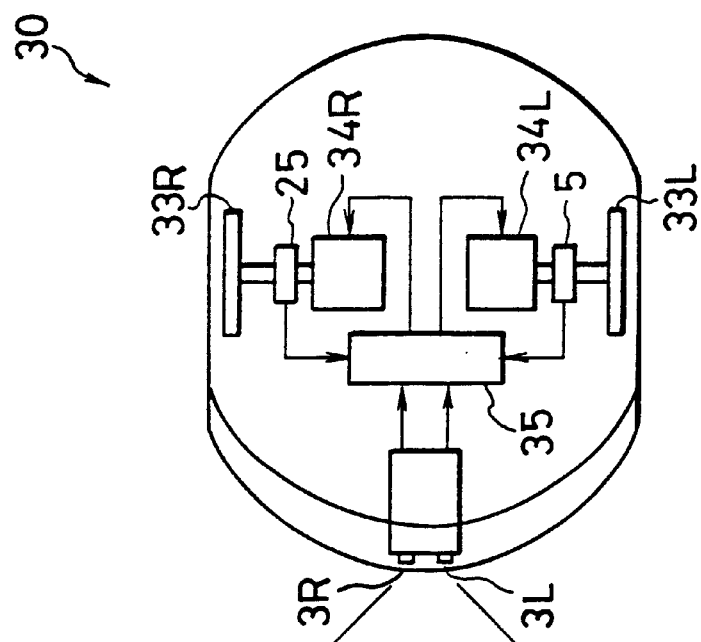
FIG. 14 is a schematic top view showing an overall construction of an autonomous running control system using an object detecting apparatus according to a third embodiment of the present invention.

Next, an operation of the drive assist system 2 according to the second embodiment will be described using a flowchart-shown in FIG. 11.

First, at S201 the left and right rear wheel travelling amounts, ΔML and ΔMR are read from the left and right rear wheel sensors, respectively and further the previous object positional information is read from the memory section 14 of the around-vehicle object recognizing apparatus 10.

Next, the program goes to S202 where it is judged from the travelling amounts ΔML and ΔMR whether the vehicle is in the turning condition or in the straight running condition, respectively. If the vehicle going straight, the program steps to S203 wherein the travelling amount ΔML is added to the previous object positional information. If it turning, the program goes to S204 wherein the turning center Pc and the turning angle $θ_c$ are calculated, respectively and after that at S105 the previous object positional information is rotated by the turning angle $θ_c$ around the above turning center Pc. Then, the program steps from S203 or S105 to the steps after S106 where the same processes as in the first embodiment are executed.

Thus, the around-vehicle object recognizing apparatus according to the second embodiment can produce the same effect as the one in the first embodiment without the use of the steering angle sensor.

FIG. 12 through FIG. 16 are related to a third embodiment of the present invention. The apparatus according to the third embodiment is for making autonomous running controls such as stopping the vehicle, avoiding obstacles and the like based on the object positional information derived from the around-vehicle object recognizing apparatus 10 described in the second embodiment.

Numeral 30 denotes an autonomous running vehicle for unmannedly doing miscellaneous works such as cleaning floors, mowing lawn and the like. The autonomous running vehicle 30 has a working apparatus 31 like mower near the rear end of the vehicle. Further, it has a pair of drive wheels (left drive wheel 33L and right drive wheel 33R) on the left and right sides of the middle portion of the vehicle. These drive wheels are powered by drive motors 34 (left drive motor 34L and right drive motor 34R) which are controlled by an autonomous running control apparatus 35

Furthermore, the autonomous running control vehicle 30 is furnished with a stereoscopic optical system 3 (left and right CCD cameras) for imaging the frontal scenery. There is provided with a left drive wheel rotation sensor 5 for detecting the number of the rotation of the left drive wheel 33L and with a right drive wheel rotation sensor 25 for detecting the number of the rotation of the right drive wheel 33R. These stereoscopic optical system 3, left drive wheel rotation sensor 5 and right drive wheel rotation sensor 25 are connected with the autonomous running control apparatus 35.

The autonomous running control apparatus 35 comprises an around-vehicle object recognizing apparatus 10 having the same function as the one in the second embodiment of the present invention and a running control section 38 for performing controls such as stopping the vehicle, avoiding obstacles and the like based upon the object positional information from the around-vehicle object recognizing apparatus 10.

Figure 15:
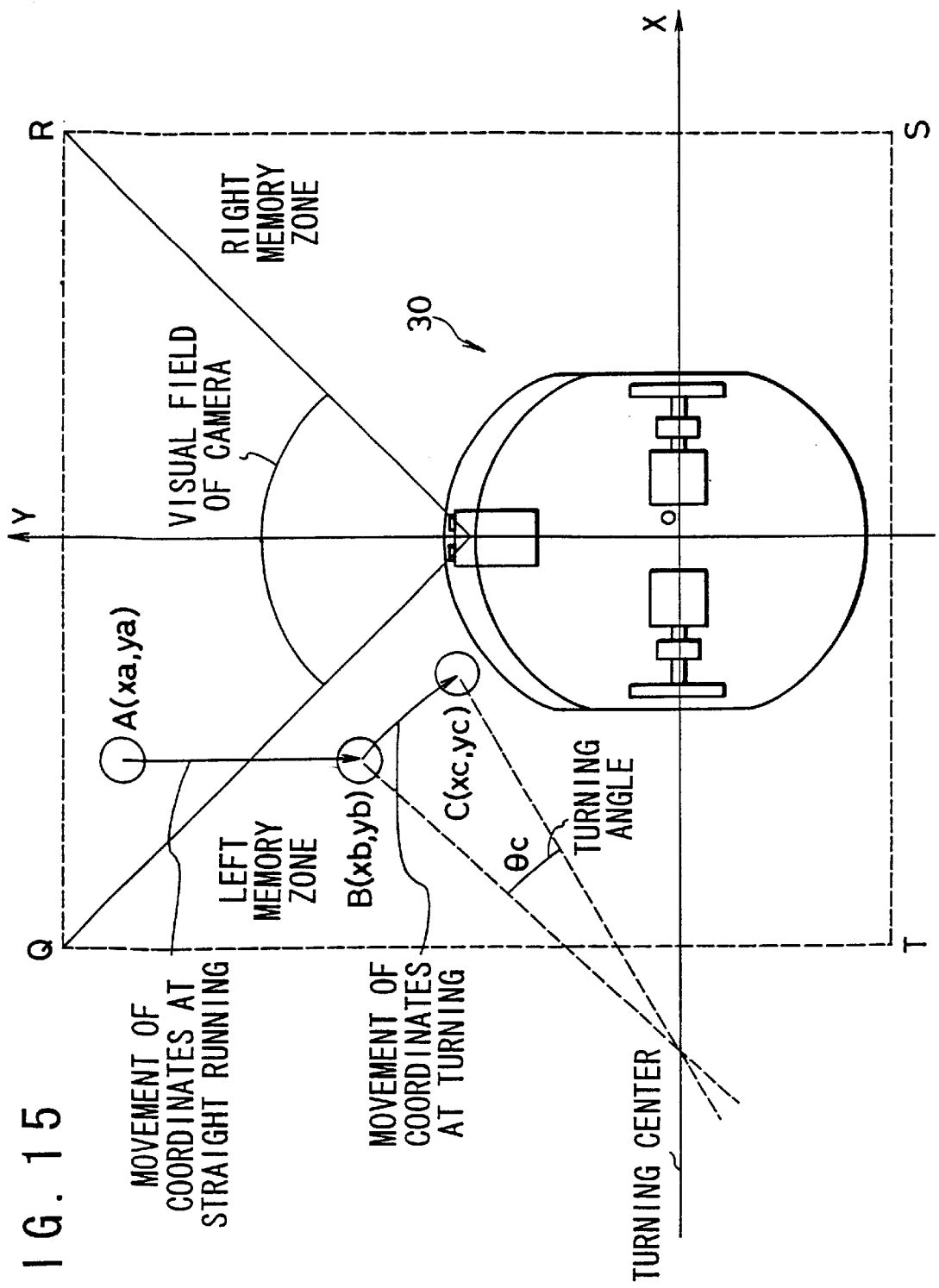
FIG. 15 is a view for explaining positional information of objects around a vehicle according to a third embodiment of the present invention.

As shown in FIG. 15, the object positional information formed by the around-vehicle object recognizing apparatus 10 is the positional information of objects enclosed by a predetermined area QRST on the X-Y plane with the vehicle centered. In case of a straight running like moving from the point A ($x_a$, $y_a$) to the point B ($x_b$, $y_b$), the new present positional information is calculated according to the aforementioned formulas (15) and (16). On the other hand, in case of a turning like moving from the point B ($x_b$, $y_b$) to the point ($x_c$, $y_c$), the new present positional information is obtained from the formulas (13) and (14). The data overflowed from the memory area and the data overlapped with the newly obtained data (visual field of camera) are erased, respectively. By adding thus obtained data to the newly obtained data (visual field of camera), the new present object positional information is formed.

In the running control section 38, it is judged whether the vehicle should be stopped or not based on the object positional information around the vehicle from the object positional information calculating section 26 by referring to the memorized external shape of the vehicle. If it is judged that the vehicle should be stopped, the drive motor 34 is rendered inoperative. If it is judged that the vehicle needs to avoid the obstacle but not to be stopped, either of the drive motors 34L, 34R on the opposite side of the obstacle is controlled so as to reduce its rotation speed.

Figure 16:
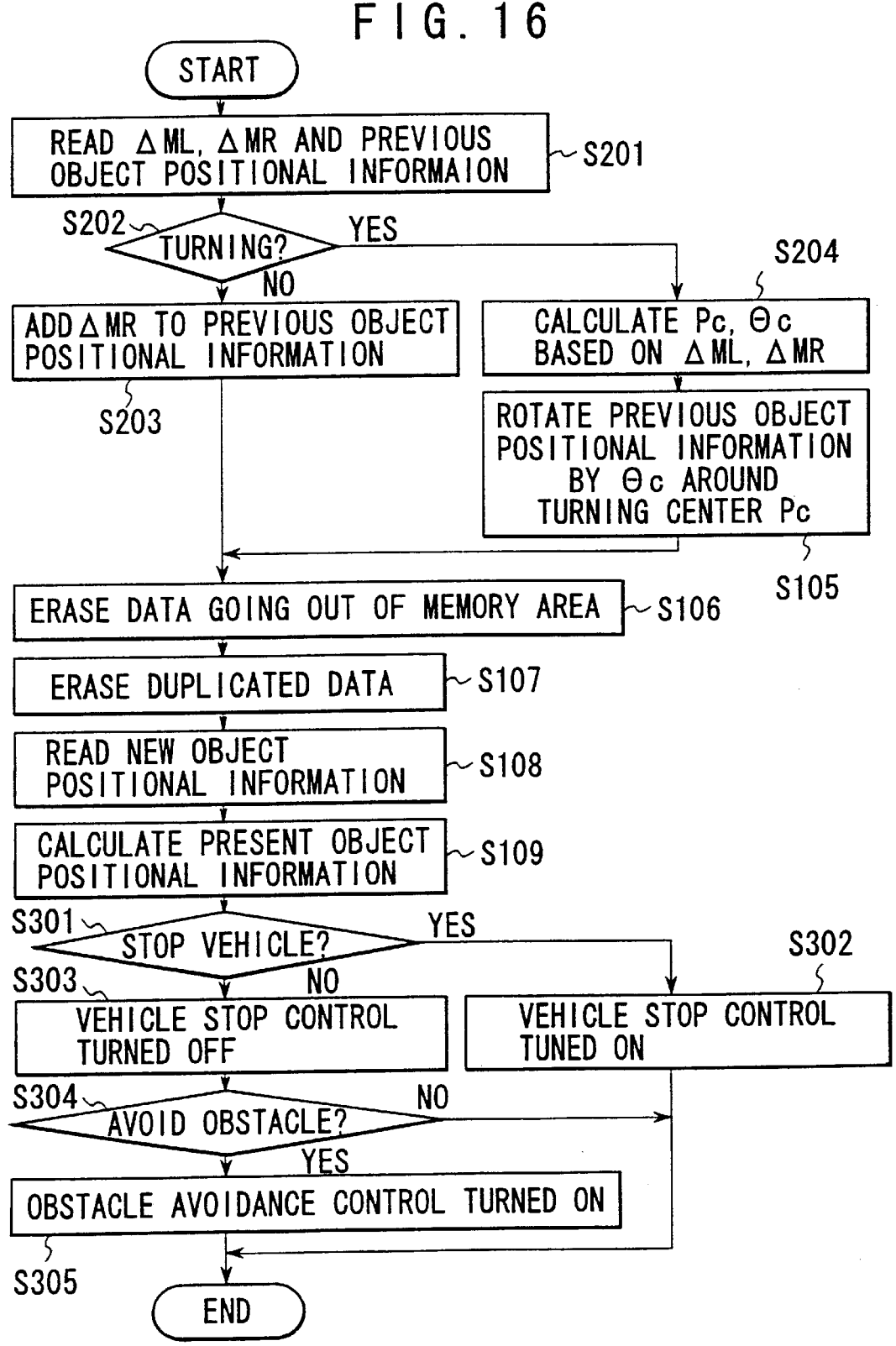
FIG. 16 is a flowchart of an autonomous running control system according to a third embodiment of the present invention.

An autonomous running control of the autonomous running control apparatus 35 will be described with reference to a flowchart shown in FIG. 16. The contents of the control from S201 to S109 are the same as those in the second embodiment except for reading "rear wheel" as "drive wheel" at S201, S203 and S204.

At S301, it is judged whether or not the vehicle should be stopped based upon the object positional information derived from the object positional information calculating section 26 with reference to the memorized external shape of the vehicle. If it is judged that the vehicle needs to be stopped due to coming close to an obstacle, the program goes to S302 where the drive motor is rendered inoperative (vehicle stop control turned on) to stop the vehicle.

On the other hand, if it is judged at S301 that the vehicle needs not to be stopped, the program steps to S303 where the vehicle stop control is turned off. After that, at S304 it is judged whether or not the vehicle should take an avoidance operation based on the object positional information derived from the object positional information calculating section 26 by referring to the vehicle external shape memorized.

If it is judged at S304 that the obstacle should be avoided, the program goes to S305 in which the rotation speed of the motor on the opposite side of the obstacle is controlled (obstacle avoidance control turned on) so as to become a calculated reduced speed value and the program is ended. Further, if it is judged at S304 that the obstacle needs not be avoided, the vehicle continues to run.

Thus, the autonomous running controls such as stopping the vehicle, avoiding obstacles and so forth can be effectively performed by applying the around-vehicle object recognizing apparatus 10 to the autonomous running vehicle. Further, it is needless to say that this around-vehicle object recognizing apparatus 10 can be used for the autonomous running vehicle having a function to run along walls or wall-like objects. Especially, when this apparatus is applied to a floor-cleaning robot, it becomes easy to work at the place very close to a wall.

Figure 17:
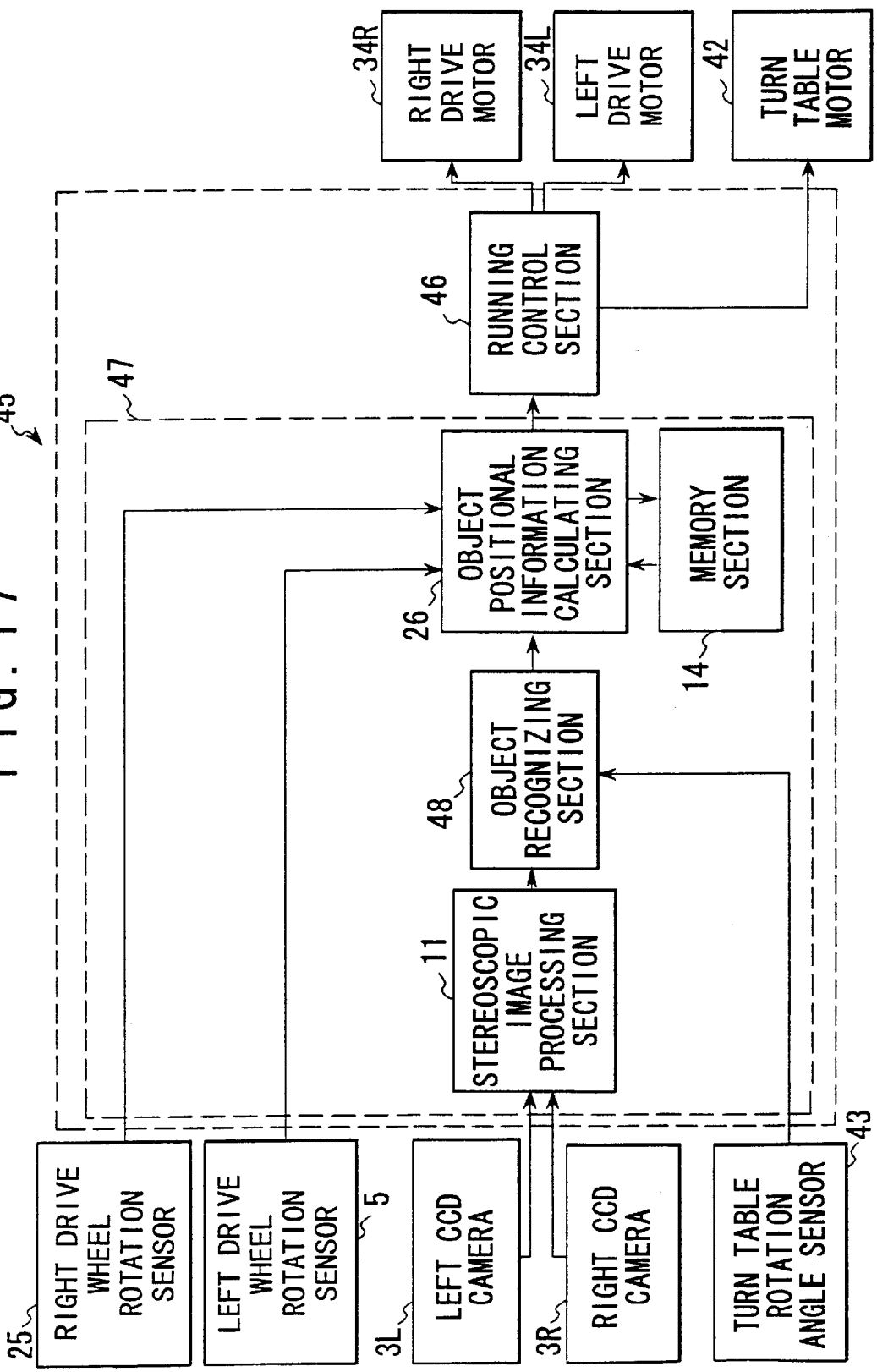
FIG. 17 is a functional block diagram of an autonomous running control system according to a fourth embodiment of the present invention.
Figure 18:
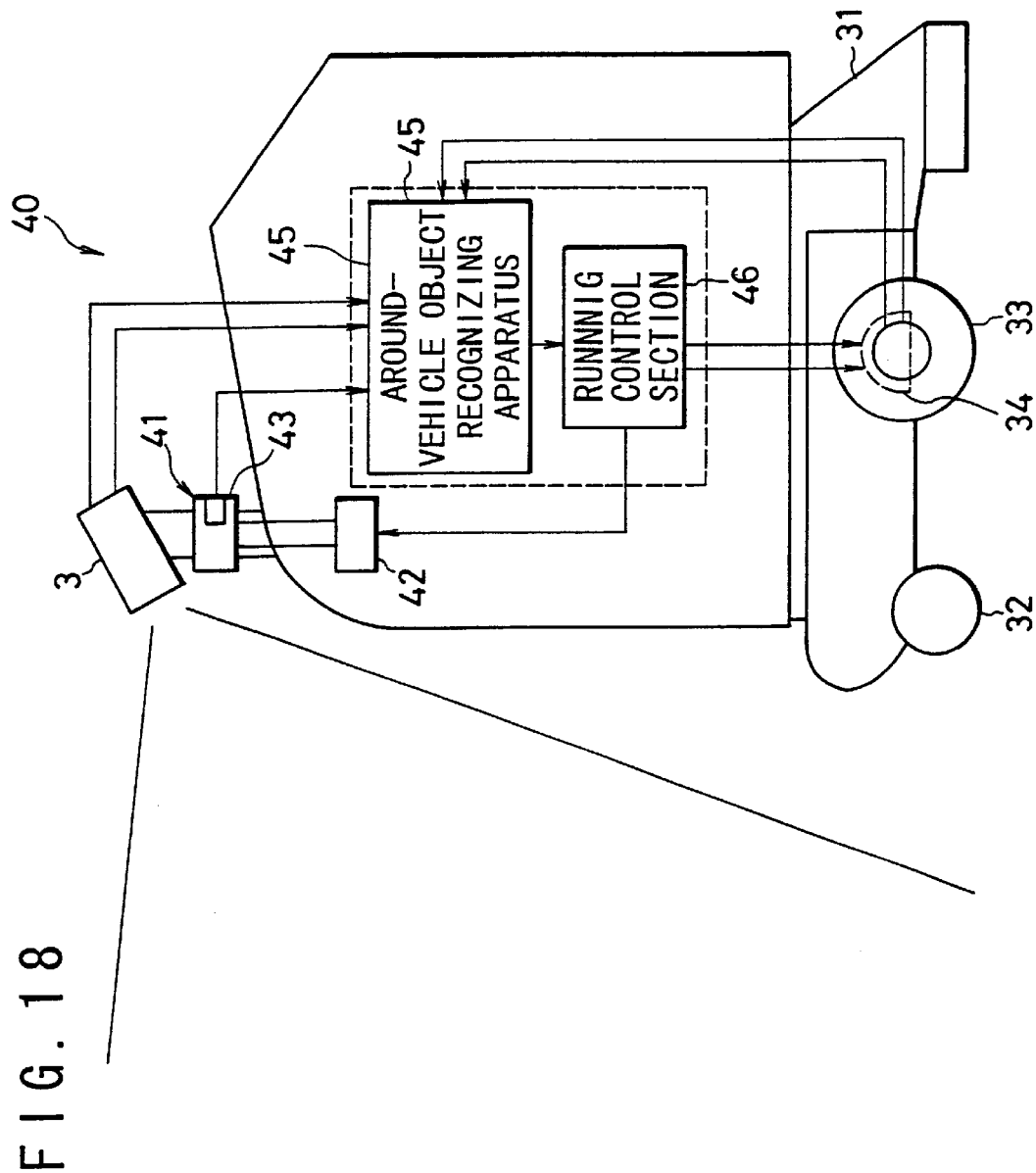
FIG. 18 is a schematic side view showing an overall construction of an autonomous running control system using an object detecting apparatus according to a fourth embodiment of the present invention.
Figure 19:
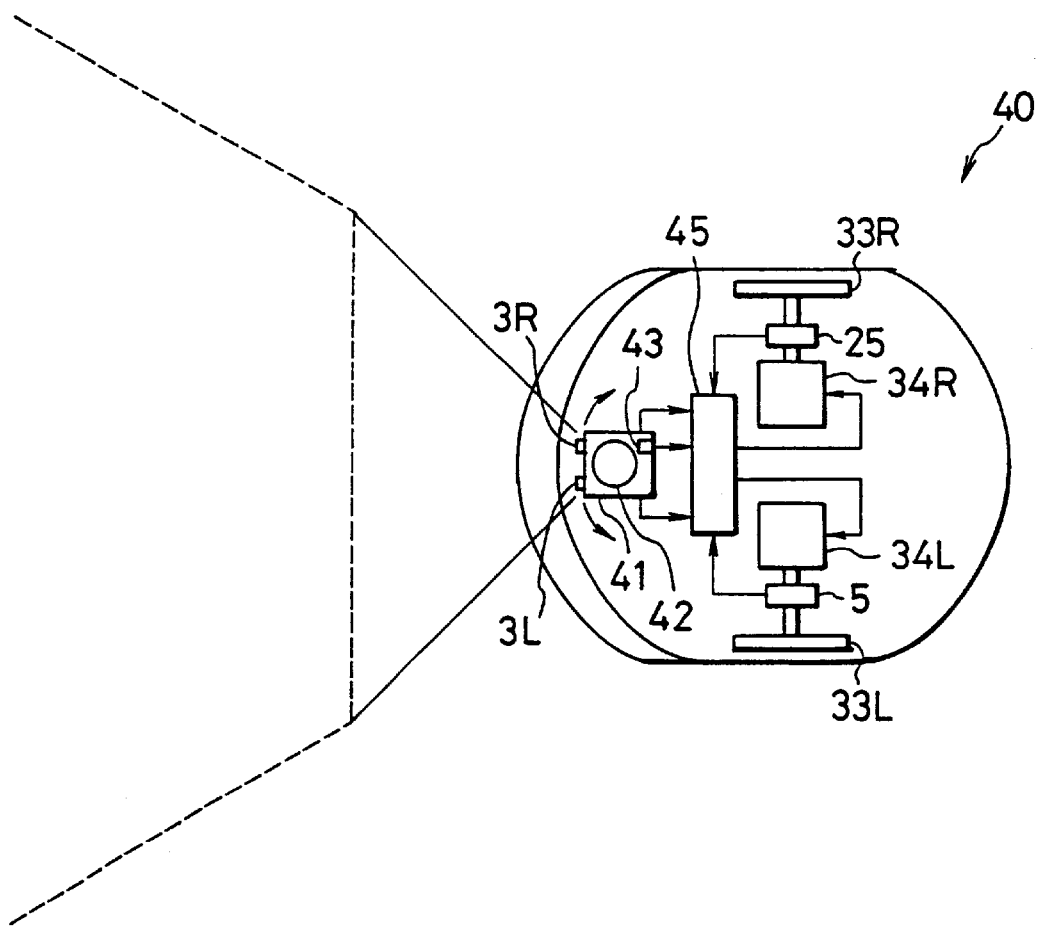
FIG. 19 is a schematic top view showing an overall construction of an autonomous running control system using an object detecting apparatus according to a fourth embodiment of the present invention.

FIG. 17 through FIG. 21 are drawings associated with a fourth embodiment of the present invention. In this embodiment, the CCD camera is rotatably mounted on an autonomous running vehicle 40 so as to take image pictures more broadly. That is to say, as shown in FIG. 17 and FIG. 18, the stereoscopic optical system 3 is fixed on a turn table 41 which is swingable in the horizontal direction so as to obtain a wider range of object information.

The turn table 41 is connected with a motor 42 so as to control the rotation angle thereof. The rotation angle α (letting the right ahead direction be 0 degrees) is detected by a rotation angle sensor 43 and is inputted to the object recognizing section 48 as shown in FIG. 17. An around-vehicle object recognizing apparatus 47 of the autonomous running control apparatus 45 has the same function as the around-vehicle object recognizing apparatus 10 in the third embodiment except for the object recognizing section 48 in the fourth embodiment.

That is to say, the object recognizing section 48 obtains parameters such as the position and the shape of objects on the road from the distance image outputted from the stereoscopic image processing section 11 in the same manner as the object recognizing section 12. In addition to this, the object recognizing section 48 calculates coordinates of an object viewed in the vehicle direction, taking the rotation angle a of the turn table 41 into consideration and outputs these coordinates of the object to the object positional information calculating section 26.

Figure 20:
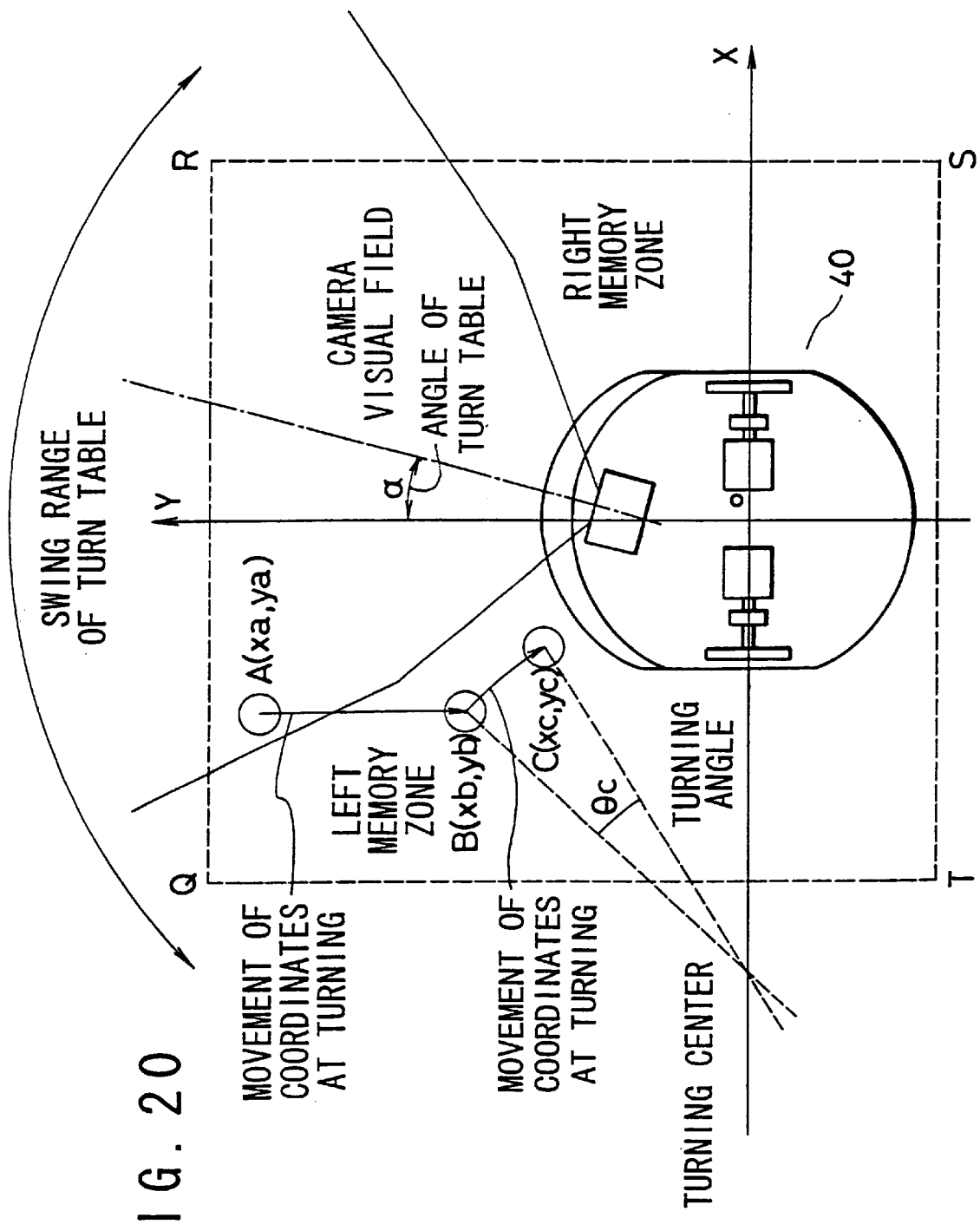
FIG. 20 is a view for explaining positional information of objects around a vehicle according to a fourth embodiment of the present invention.
Figure 21:
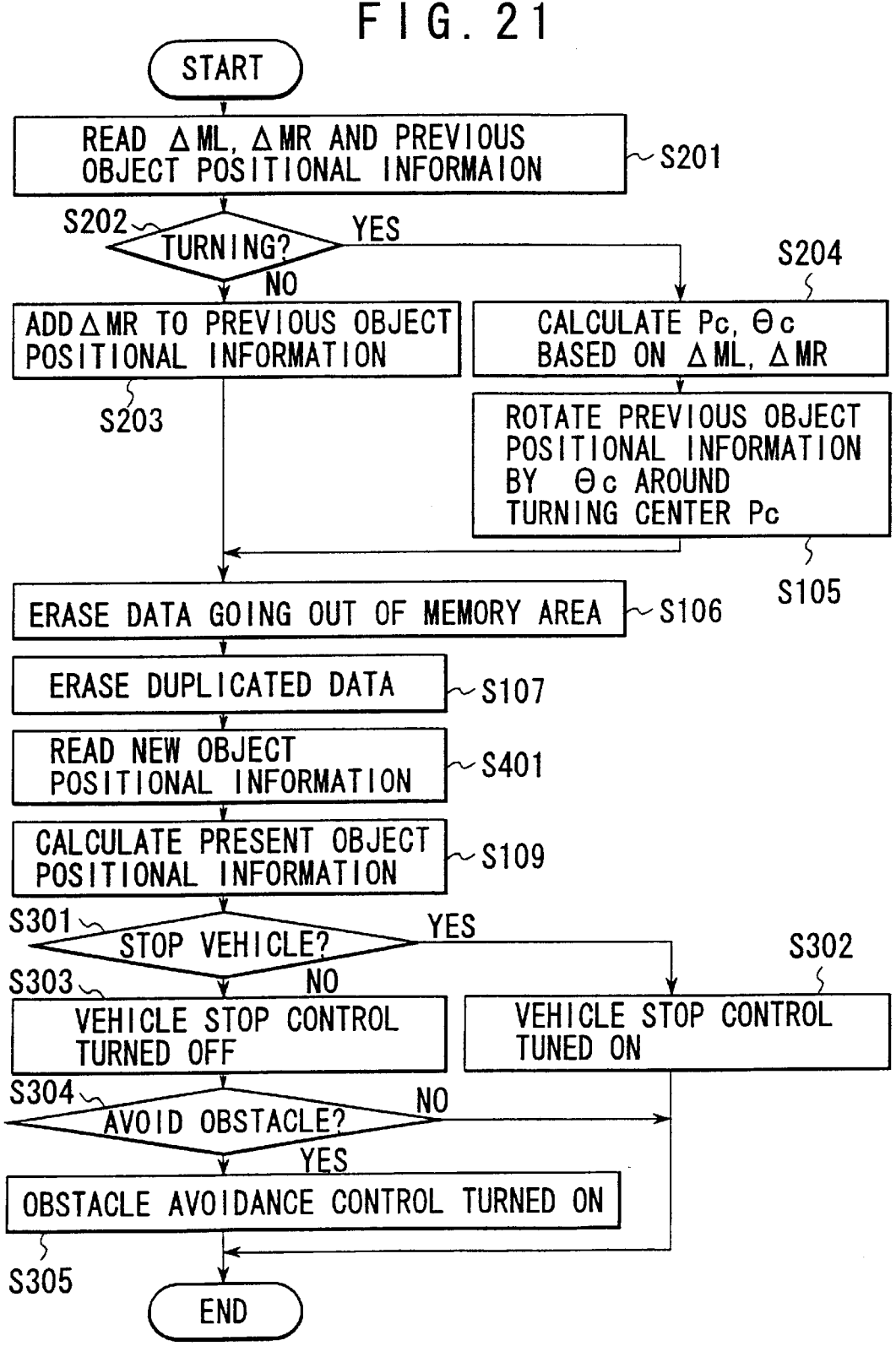
FIG. 21 is a flowchart of an autonomous running control system according to a fourth embodiment of the present invention.

As shown in FIG. 20, in this embodiment, since the picture image obtained through the stereoscopic optical system 3 is deviated by α of the rotation angle from the right ahead direction, the coordinates of the object must be corrected. The corrected object positional information is added to the one viewed in the right ahead direction.

In the running control section 46, the running control such as stopping the vehicle, avoiding obstacles and the like is performed based on the object positional information in the same manner as in the running control section 38 of the third embodiment of the present invention. Further, the running control section 46 controls the stereoscopic optical system 3 so that it swings to the left and right at a constant speed. In this case, the movement of the stereoscopic optical system 3 may be adjusted to the movement of the vehicle, for example, when the vehicle turns to the left, the stereoscopic optical system 3 is swung to the left and when the vehicle turns to the right, the stereoscopic optical system 3 is swung to the right.

The flow of control in the autonomous running control apparatus 45 is the same as the one in the autonomous running control apparatus 35 according to the third embodiment except the process of routine at S401.

That is to say, after the data overlapped with the newly obtained positional information are erased from the previous object positional information at S107, the program goes to S401 where the new object positional information corrected by the rotation angle a of the turn table 41 is read and proceeds to S109.

Thus, in the fourth embodiment of the present invention, in addition to the effect obtained in the third embodiment, a wider range of visual field of camera can be obtained, this enabling the autonomous running vehicle to do more accurate and more sophisticated works.

Throughout the embodiments from the first to fourth one of the present invention, the around-vehicle object recognizing apparatus is constituted so that objects around the vehicle are recognized based on picture image acquired by the CCD camera, but other means such as laser radar, ultrasonic sensor and the like may be employed instead of the CCD camera.

Further, in the aforegoing embodiments of the present invention, the calculation of object positional information has been made on the orthogonal coordinates system but it may be performed on the polar coordinates system.

In summary, according to the present invention, since the positional information of objects around the vehicle is always updated and memorized as the vehicle travels, the objects can be recognized at a wide range of the area around the vehicle without the use of additional cameras, sensors and other sophisticated detecting devices.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A driving assist system for a vehicle having a pair of cameras mounted on said vehicle for taking a stereoscopic picture of an object in front of said vehicle, comprising:

stereoscopic image processing means for deriving a distance information from said stereoscopic picture about said object being in a visual field of said pair of cameras;

object recognizing means for recognizing said object and for calculating relative position of said object with respect to said vehicle;

object position memory means for memorizing said relative position of said object when said object is in a predetermined area outside of said vehicle including out of said visual field of said pair of cameras;

traveling amount calculating means for calculating said vehicle traveling amount; and object positional information calculating means for updating said relative position of said object based on said vehicle traveling amount so as to recognize a current relative position of said object being out of said visual field of said pair of cameras.

2. The driving assist system according to claim 1, wherein:

said traveling amount calculating means calculates said vehicle traveling amount based on an output of a wheel rotation sensor and an output of a steering angle sensor.

3. The driving assist system according to claim 1, wherein:

said traveling amount calculating means calculates said vehicle traveling amount based on a rotation number of a right rear wheel and a rotation number of a left rear wheel.

4. The driving assist system according to claims 1, wherein;

said object position memory means deletes said relative position of said objects when said objects move out of said predetermined area outside of said vehicle according to traveling of said vehicle, and memorizes said relative position of said objects calculated by said object recognizing means as a current relative position when said object are in said visual field of said pair of cameras.

5. The driving assist system according to claim 1 wherein said object recognizing apparatus further comprises;

judging means for determining whether or not there is a possibility of a contact between said vehicle and said objects by comparing said relative information with a predetermined information stored in a memory;

indicating means for indicating said possibility to a driver.

6. A driving assist system for a vehicle having a pair of cameras mounted on said vehicle for taking a stereoscopic picture of an object in front of said vehicle, a left driving wheel driven by a left wheel driving motor provided on a left side of said vehicle and a right driving wheel driven by a right wheel driving motor provided on a right side of said vehicle, comprising:

stereoscopic image processing means for recognizing said object and for deriving a distance information from said stereoscopic picture about said object being in a visual field of said pair of cameras;

object recognizing means for recognizing said object and for calculating relative position of said object with respect to said vehicle;

object position memory means for memorizing said relative position of said object when said object is in a predetermined area outside of said vehicle including out of said visual field of said pair of cameras;

traveling amount calculating means for calculating said vehicle traveling amount;

object positional information calculating means for updating said relative position of said object based on said vehicle traveling amount so as to recognize a current relative position of said object being out of said visual field of said pair of cameras; and running control means for deciding a running direction of said vehicle by judging whether or not there is a possibility of a contact between said vehicle and said object by comparing said relative position with a predetermined information about said vehicle stored in a memory and for driving said left and right motors so as to make said vehicle run precisely on a predetermined course only by said left and right driving wheels.

7. A driving assist system method for a vehicle having a pair of cameras mounted on said vehicle for taking a stereoscopic picture of an object in front of said vehicle, comprising:

deriving a distance information from said stereoscopic picture about said object being in a visual field of said pair of cameras;

recognizing said object and for calculating a relative position of said object with respect to said vehicle;

memorizing said relative position of said object when said object is in a predetermined area outside of said vehicle including out of said visual field of said pair of cameras;

calculating said vehicle traveling amount; and updating said relative position of said object based on said vehicle traveling amount so as to recognize a current relative position of said object being out of a visual field of said pair of cameras.

8. A driving assist method for a vehicle having a pair of cameras mounted on said vehicle for taking a stereoscopic picture of an object in front of said vehicle, left driving wheel driven by a left wheel driving motor provided on a left side of said vehicle and a right driving wheel driven by a right wheel driving motor provided on a right side of said vehicle, comprising:

deriving a distance information from said stereoscopic picture about said object being in a visual field of said pair of cameras;

recognizing said object and calculating a relative position of said object with respect to said vehicle;

memorizing said relative position of said object when said object is in a predetermined area outside of said vehicle including out of said visual field of said pair of cameras;

calculating said vehicle traveling amount;

updating said relative position of said object based on said vehicle traveling amount so as to recognize a current relative position of said object being out of said visual field of said pair of cameras; and deciding a running direction of said vehicle by judging whether or not there is a possibility of a contact between said vehicle and said object by comparing said relative position with a predetermined information about said vehicle stored in a memory and for driving said left and right motors so as to make said vehicle run precisely on a predetermined course only by said left and right driving wheels.

* * * * *